(12) United States Patent
Amiri

(10) Patent No.: US 8,471,817 B2
(45) Date of Patent: Jun. 25, 2013

(54) POCKET DATA INPUT BOARD

(76) Inventor: Ahmad Amiri, Richmond Hill (CA)

( * ) Notice: Subject to any disclaimer, the term of this patent is extended or adjusted under 35 U.S.C. 154(b) by 1037 days.

(21) Appl. No.: 12/173,691

(22) Filed: Jul. 15, 2008

(65) Prior Publication Data

US 2009/0073127 A1 Mar. 19, 2009

Related U.S. Application Data

(63) Continuation of application No. 10/290,408, filed on Nov. 8, 2002, now Pat. No. 7,423,634.

(51) Int. Cl.
*G09G 5/00* (2006.01)
(52) U.S. Cl.
USPC ............................................. 345/168; 341/22
(58) Field of Classification Search
USPC .. 345/168–169, 173; 341/22, 34; 379/433.07; 84/719; 400/714; 178/18.01
See application file for complete search history.

(56) References Cited

U.S. PATENT DOCUMENTS

| 6,489,576 B2* | 12/2002 | Ito et al. .................. 200/310 |
| 6,809,725 B1* | 10/2004 | Zhang ....................... 345/171 |
| 7,768,501 B1* | 8/2010 | Maddalozzo et al. ...... 345/173 |

* cited by examiner

*Primary Examiner* — Abbas Abdulselam

(57) ABSTRACT

The invention is a transparent keyboard with translucent markings to show the functions of each key. It can rest over the screen of a computer, hand held device, smart phone or the like, without obstructing the screen or using it for marking the keys or reducing the size of the screen area that is used as a screen or monitor as against a keyboard. It can be made by translucent markings on existing touchscreen keyboards or a transparent layer over the touchscreen with translucent markings. It can be a transparent screen with programmable markings. It can be touch sensitive, yet use key layouts and sizes to prevent unintended key activation and ease multi finger typing.

20 Claims, 25 Drawing Sheets a b c d a b

POCKET DATA INPUT BOARD

CROSS REFERENCE TO RELATED APPLICATIONS

This is a Continuation of U.S. application Ser. No. 10/290,408, filed Nov. 8, 2002, which claims the benefits of U.S. provisional Application 60/331,143 filed Nov. 9, 2001.

BACKGROUND OF THE INVENTION

1. Field of Invention

This invention relates to Digital Data Input Devices, in particular those used for hand held or portable devices such as PDAs and Smart Cell Phones.

2. Discussion of Prior Art

Personal Digital Assistants (PDA)s, Hand Held Computers, Mobile Smart Phones, and their "hybrids" collectively referred to in this Description as Mobile Communicating Computers (MCC), need a "proper" Data Input Board (DIB), but lack one.

MCC will be used in this Description as "the device which uses E-Board as a DIB" MCCs can have almost all the features of a desktop computer, if a proper DIB is added.

One category of input device that MCCs currently use are Scroll, Stylus or the like.

In fact they are just "selection devices" that only can choose from a "menu".

All are slow, frustrating and difficult to use. Besides, they use some of the much scarce and needed space on the surface of the pocket portable device, reducing the screen.

Another category of Data Entry is "Hand Writing Recognition" and "Voice Recognition". Both are slow, inaccurate, need editing, use much processing, memory, power and for HWR, screen area, all very scarce and needed in pocket portable devices.

Besides, Voice Recognition cannot be used in classroom, library, conference, etc. One version of HWR is called "grafitti", which uses a different one stroke per character alphabet, for faster writing. On top of all other problems, the operator has to learn a new writing alphabet which has no use elsewhere.

Truly mobile devices, i.e. small, light that do not require a dedicated pocket exist. But they are all very difficult to use. For example:

tiny keypads, can be used by just one finger at a time, using high actuation force thumboards using one or two thumbs, just as slow, high force and frustrating tiny on screen keyboards, operated by a stylus, one character at a time, hence slow This category also steals much scarce screen area, reducing the screen to micro in cell phones and to mini in PDAs.

To demonstrate inadequacy all current devices put together, consider how less useful and limited a desktop with all such inputs, but without a proper keyboard, would be.

Another category are Foldable and Rollable keyboards. They are mobile but require an extra dedicated pocket. Considering all the other things that have to be carried, that carrying anything bulky in a pocket is inconvenient and unsightly, that most shirts have no or just one pocket, and that the overall goal is to be totally free of all entanglements, any additional bulk or any additional pocket is unwelcome.

Besides they need a desk, can't be used on the go nor held in hand with MCC. Logitek offers a rollable keyboard using Elektric Textile, which wraps around the MCC. But it almost doubles both the Bulk and the Weight of a typical PDA.

"Mobile" does not mean, by many users, to be just "moving", but to be "free", to work, communicate, surf and entertain, anywhere, anytime, without inconvenience. Having to sit down and need of a desk is not mobile, nor free, nor always possible.

One category that the applicant regards as the best are "Mini Keyboards".

They occupy a separate pad which flip folds onto the main body of the MCC.

They are better than most High Actuation Force others for being Touch Sensitive.

But they have small and crammed keys to fit all needed ones in a small area.

This means having to locate each key carefully, then press it carefully not to activate the adjacent keys, and often having to correct unintended inputs.

Besides, they add considerable thickness and weight to the MCC.

Once an MCC exceeds a certain thickness, it becomes undesirable.

Being slow, inaccurate, thick and heavy, beyond users, tolerance are problems.

Need for an Pocket Data Input Board: All above are commendable efforts by inventors, engineers, scientists and manufacturers, to get us one step closer to what is needed. The applicant, in identifying their inadequacies is merely identifying need for improvement, as well as complying with "specification" writing protocols.

Otherwise, the applicant admires all said ingenious devices.

The fact that so many brilliant attempts have been made by the provider group, being the inventors, scientists, engineers, manufacturers and distributors proves dire need.

The fact that so many consumers have adopted some very difficult to use systems, such as "grafitti" or popular use of one thumb to strike 3 keys of a cellphone keypad for each character for text messaging reconfirms such dire need for a mobile input.

The fact that bulky and not true mobile Foldable keyboards sold over one million in less than three years of introduction is the acid test of the desperate need for mobile inputs.

The E-Board (Objectives and Advantages): "E-Board" is a full features pocket portable Data Input Board (DIB), for MCCs.

Since nearly all versions of said DIB are "keyless", it is referred to as "E-Board".

This Description teaches how to make a DIB, called E-Board that:

Can have almost all the features of a desk keyboard, and even more, such as:

well spaced and large character Nodes (replacing keys)

sufficient number of characters low actuation force or touch sensitive Nodes, hence fast and fun to use simultaneous multi-fingers, one or two hands operation Yet it:

can fit into a small pocket, even with an MCC (in the same pocket)

adds no or negligible weight and/or volume to MCC is operable, in hand, on the arm, belt, necklace, desk, etc can harbor stylus and scroll, freeing space for screen, memory, processor, etc.

In addition, E-Board aims to achieve several other improvements in prior art.

Many objectives and advantages of E-Board will become apparent from the drawings, Summary, Specification, etc.

For example introducing:
credit card size but fully functional E-Boards
a type of transparent E-Board that covers all the screen
a better way of allocating Nodes to characters
ways of folding a circuit, more acutely than possible before, without damage
a thin, tiny, one finger mouse
marking techniques for faster locating of almost 2 dimensional Nodes
alternative power sources for E-Board, s.a. photocell, heat cell, thin batteries
a foldable and/or pocket portable photocell power source for MCCs
contourable elastomer circuit boards and E-Board
many other techniques, devices, improvements, etc. as will be seen The main and the more general objective is to combine following objectives:

E-Board should be big to have large, well spaced, full set of characters.

Yet E-Board must be small and light to be pocket portable and hand held.

Hence for E-Board creation, a technical paradox needs to be solved.

CLAIMABILITY (Novelty, Inventiveness, Utility): E-Board solves a technical contradiction, being small physically but big functionally. E-Board is constructed not by one innovation, but by combinations of many.

Most Techniques/Devices described here are claimable in many ways, such as:
on their own right, in isolation from others
in combination with others
for general uses beyond E-Board
E-Board, as a package, and its variations enjoying:
Novelty—not available in prior art
Unobviousness—as hundreds of industry-wide attempts have failed to make one
Usefulness—as thousands of articles in all media point to need for such a tool Writing Style of this DESCRIPTION: To make an E-board, many techniques are developed. Many of such techniques are different permutations of various techniques. The writing style has to be somewhat unconventional to cater to such multi-options.

Key words are either Quotation Marked or Capitalized, to stand out.

Acronyms are created on one occasion that a phrase is used, to be used elsewhere.

An acronym is formed from first (usually capitalized) letters of words in a clause.

Some deviation from grammar and some coined words are used for simplicity.

Whenever a variety of techniques or options are offered, it usually means any of the offered options, unless some other meaning is obvious from the wording.

Many of techniques or devices that are used here are not detailed, as they are known to a person skilled in the art.

Only their relevant key properties related to this application are mentioned.

This Description often uses "logical combinations of two or more techniques". There may be a very large number of possible combinations of such techniques. But some of those possible combinations can be technically invalid or nonsensical. "Logical" are combinations that make technical sense to a person skilled in the art. "Logical" excludes technically incompatible combinations, but includes viable ones. This was done not to have to repeat every possible combination.

Many areas of the prior art had to be improved, and many new arts had to be developed to tackle all the objective, and since the E-Board has many components and inherent techniques, all of which needed to be modified or created in various forms.

Therefore, contrary to applicants wishes, the Description is unavoidably LONG.

SUMMARY OF THE DESCRIPTION

This Description is to teach a person skilled in the art how to make the E-Board.

"E-Board", a Little Big "Data Input Board" is unattainable in prior art.

Making of E-Board requires a multiple of "challenges", each tackled in many ways.

Platforms from which prior keyboards are made mast undergo considerable change.

Those changes are not just in one step of construction, but almost in every step.

Here is a summary of what different sections teach towards making an E-Board:

A—using the right Technology or Digital Input Platform
B—reducing the "thickness" of E-Board, also its volume, bulk and weight
C—reducing the surface area, without reducing utility
D—increasing number, size and distances of keys, yet preserving portability
E—multi Pad E-Boards, which Pads can fold or be detached for pocket transport
F—making E-Board touch sensitive
G—making E-Board faster, in particular by marking larger targets for fingers
H—more efficient distribution of characters
I—making E-Board Structurally Self Supporting or sturdy for stand alone operation E-Board can be made by logical combinations of Techniques introduced here. Some of those combinations make better E-Boards, for certain uses than others.

Other sections of the Description teaches various techniques, devices, parts etc. It elaborates some items or ideas, and explains other features of importance to E-Board, such as:

Alternative power sources such as photocell and heat cells
Elastomer printed circuit boards
Contourable E-Board
Transparent E-Board covering most of the screen
Micro size but functional, fast and fun E-Board
Techniques to Fold a circuit, tightly and repetitively without damaging it
One Finger, Thin mouse
Faster than Qwerty or Dvorak characters arrangement
Less Known Attempts in Prior Art: Prior art does have Foldable Keyboard.

But none has a Very Thin and Foldable one that has made it to production.

Even Unfoldable, but Ultra Thin keyboard is yet to be produced.

Some inventors also suggest a "foldable" keyboard, some a thin one.

But folding a thin circuit board can damage the board and its circuit.

They rely on some presumed available mechanism for safe folding of adjacent parts of a thin circuit board over each other.

But none, suggests any particular specific technology.

Technologically, this is a difficult area that has defeated many attempts to solve it.

Many other attempts at folding a keyboard have been made.

All are either folding a thick keyboard which naturally provide a safe radius of fold.

Or in any case, keep silent about the very difficult technological barrier of folding a thin circuit board, safely.

Thus rendering those silent systems unsuitable to make a foldable E-Board.

None of those systems are used here as a platform or basis for E-Board.

All such attempts known to the applicant are far from relevant to be detailed here.

This Specification actually develops new techniques for safe folding.

Figure 1:
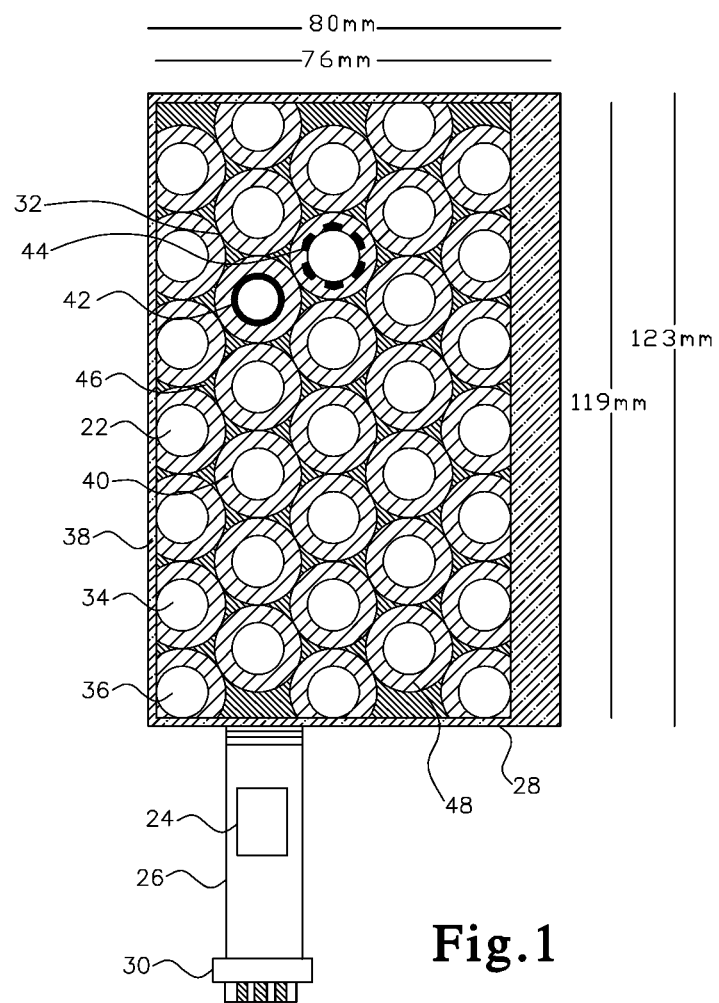
FIG. 1 shows a 1-Pad E-Board viewed from above its working surface
Figure 2:
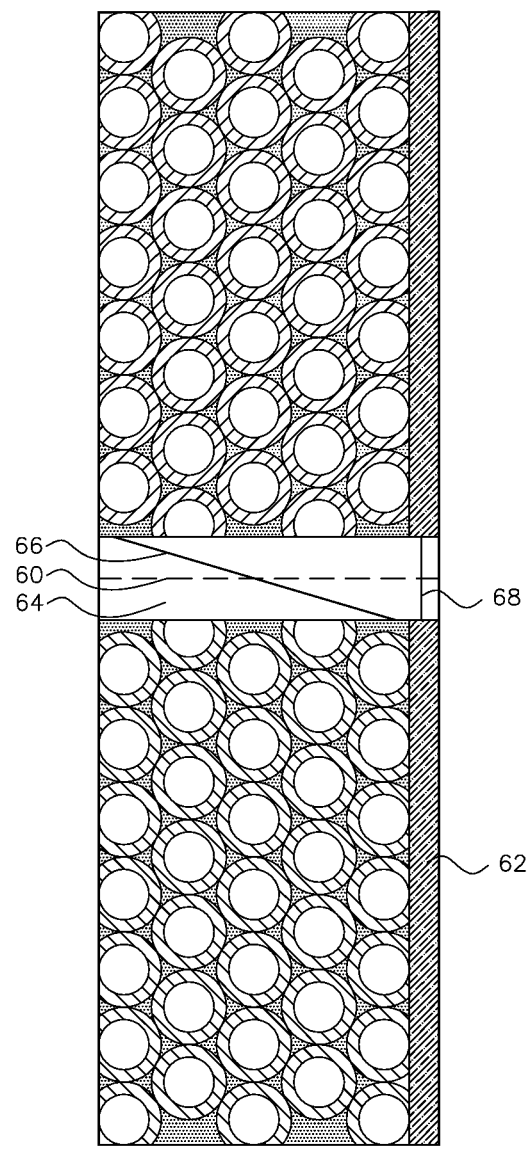
FIG. 2 shows a 2-Pad E-Board viewed from above its working surface
Figure 3:
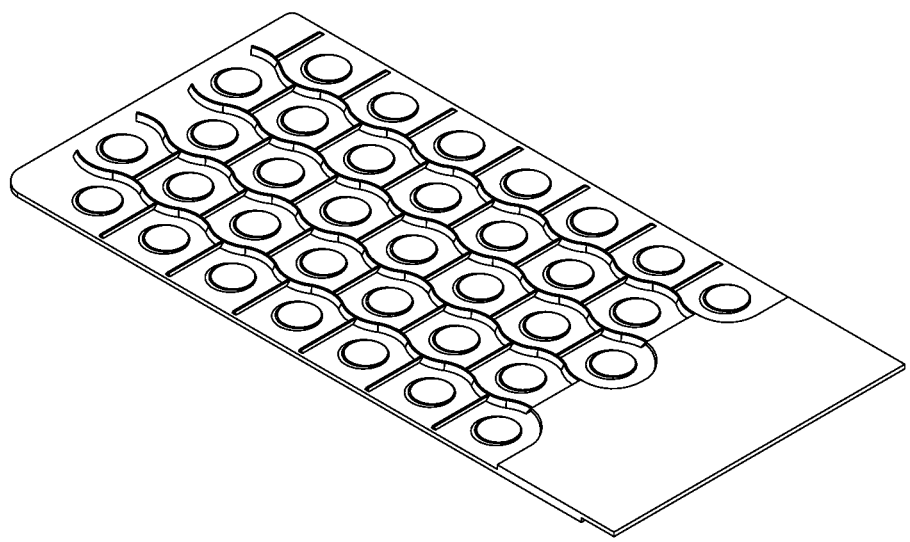
FIG. 3 shows a 1-Pad E-Board with Walled Nodes
Figure 4:
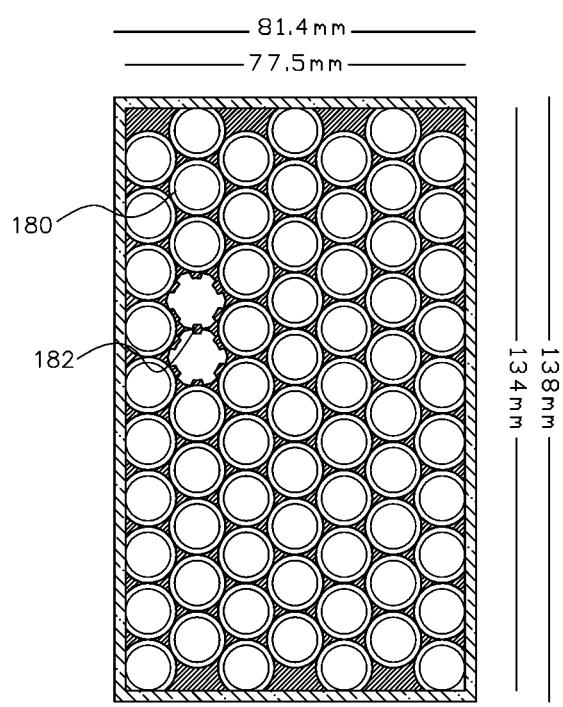
FIG. 4 shows a 1-Pad E-Board using Walled Nodes
Figure 5:
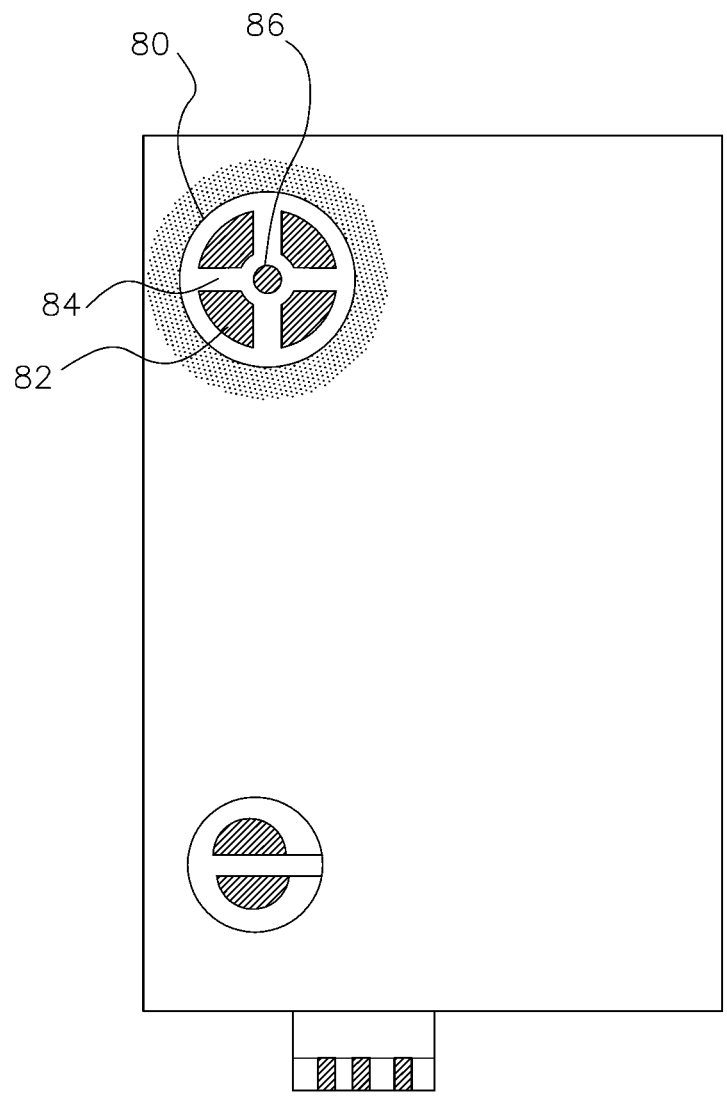
FIG. 5 shows a general look of a Pointer Node circuit
Figure 6A:
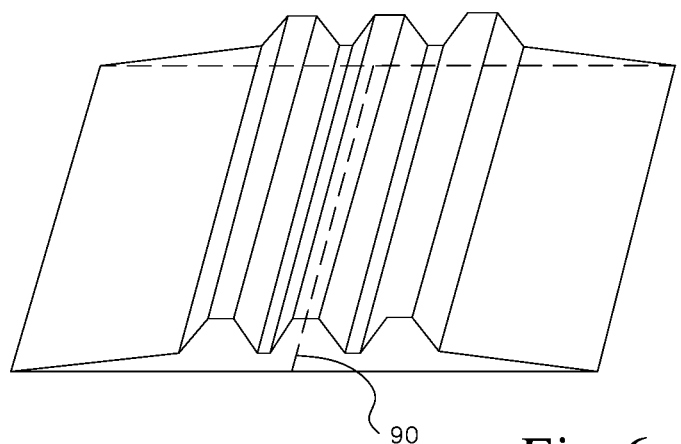
FIG. 6 shows a Circuit Curve Limitor
Figure 6B:
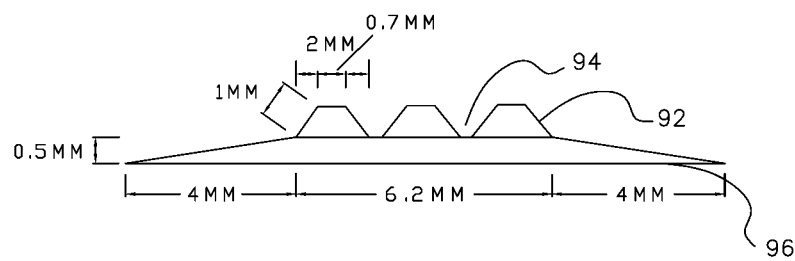
Figure 6C:
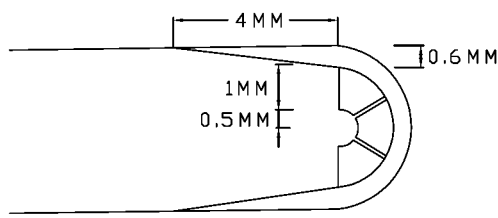
Figure 7A:
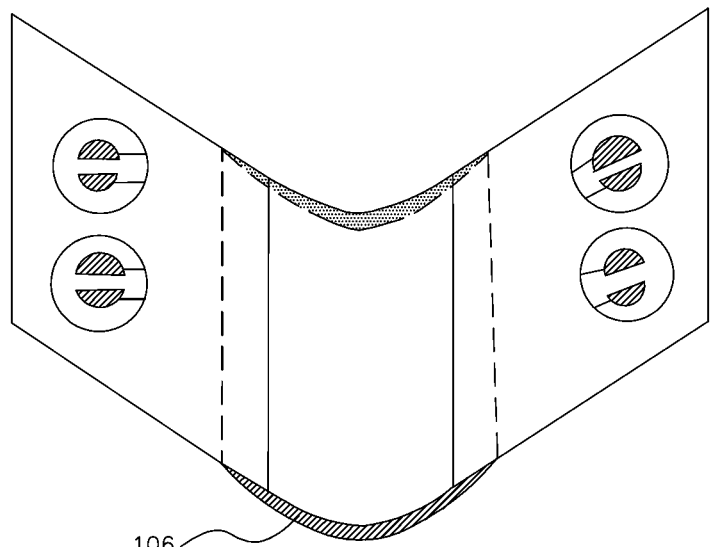
FIG. 7 shows a Circuit Crease Protector
Figure 7B:
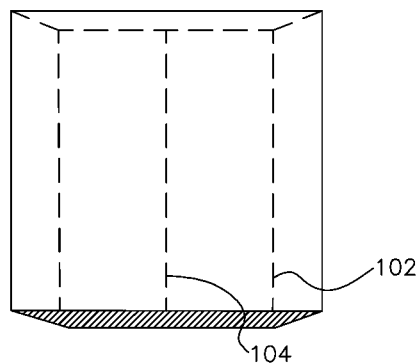
Figure 8:
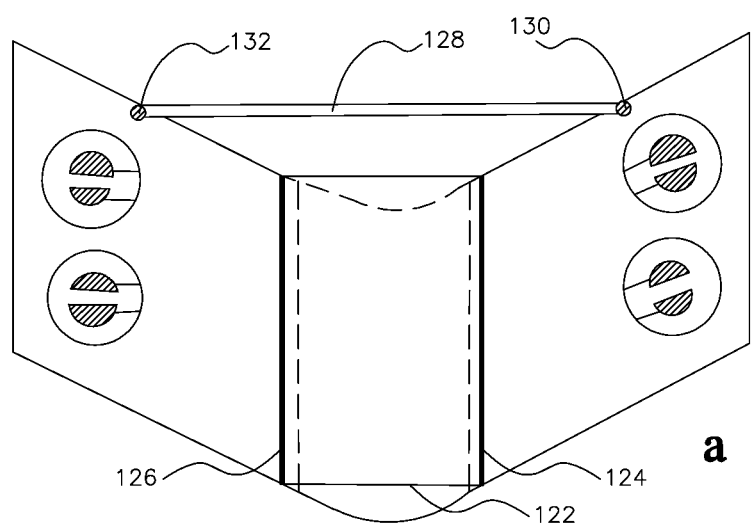
FIG. 8 shows an Unfold Limitor
Figure 8:
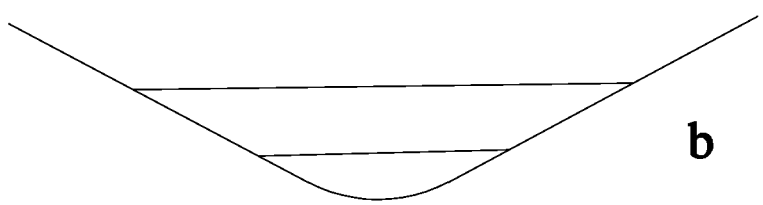
Figure 9:
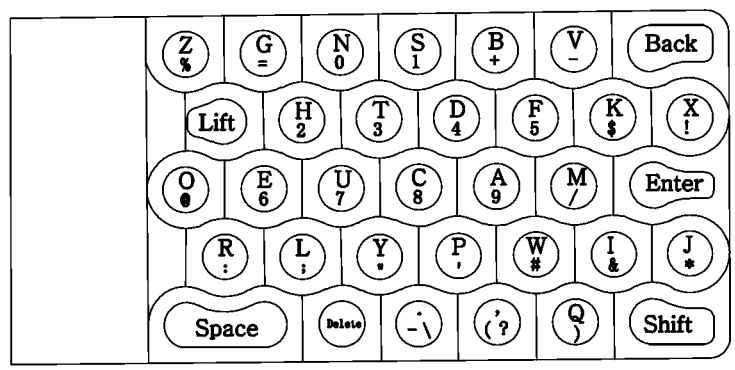
FIG. 9 shows a 1-Pad E-Board with one version of a Layout

Reference Numeral Y on Figure X is denoted by FX-Y such as F1-22

Description—The E-Board

Section A—Using the Appropriate Digital Input Platform (DIP)

Two of our broader goals are to make E-Board:

Thin, Light and Small for "pocket portability"

Multi-Finger and Light Touch Operation to be Fast, Efficient & Fun.

Above are difficult on their own and technically contradictory to a large extent.

It helps a lot if the underlying Digital Data Input System can more easily accommodate all the characteristics and/or modifications needed to achieve above and other goals.

"DIP", short for Digital Input Platform here means the "electro-mechanical" or "electronic" system or technology, which is used to make a Data Input Device, by converting operator's finger touch or proximity into electronic codes identified by a computer as characters.

There are a number of technologies used for various keyboards.

None have or can achieve all of the required properties of E-Board.

But an appropriate DIP, combined with techniques and/or devices introduced here can.

An "appropriate" DIP should ideally have the following features:

"Thin", such that an E-Board using it can be made less than three, two, preferably less than one or even a fraction of Millimeter mm thick.

"Light", weighting less than 50 Grams, preferably less than Twenty Grams. (for Seventy character Nodes, as large and as well spaced as standard desk keys).

Touch Sensitive (TS) or Low Actuation Force (LAF), requiring little finger pressure. Activation Force (AF) to be close to touch typing keyboards, around 50 grams. Higher AF are functional but adversely affect fast or Touch Typing. Typical MCC Thumboards and Keypads need very high AF.

"Low Power", not to drain the scarce battery capacity in mobile devices

"Modifiable" to acquire above properties, if not its normal characteristic.

Above criteria are necessary but not sufficient to make a good E-Board.

DIPs that "depend" on bulky keys or pressure to operate are not good candidates. Following DIPs, are known to the skilled in the field.

New ones will be known to the skilled when published.

They meet above criteria, but in different degrees, and suit various applications:

A1—Standard Mechanical keys—with springs is mentioned for completeness.

It is a poor choice, as it is typically not thin nor light, even though LAF.

It requires drastic modifications to approximate our needs.

But it can be a system to make a less than ideal E-Board using techniques herein.

Its inclusion here is for completeness and encompassing more variations.

A2—Optic Fiber Fabric, pressing on which affects the light passing through its fibers. Such change, its location and density is registered by a controller.

A3—Electro-Textile—by Elektex (UK), is a fabric with conductive fibers in x and y directions, which detect the location and amount of pressure at the point of touch.

Earlier versions did not meet any of our criteria but it has the potential to become thin, light and perhaps LAF.

A4—Membrane Keyboards—are Thin and Light, but typically require AF above 120 grams, hence not Touch Sensitive. But can be made LAF, as will be shown.

A5—Any DIP, having or which can be modified to acquire above criteria.

Some exist or are being developed by the applicant, and perhaps others.

A6—Any logical combinations of systems in "A".

It may make sense to use different DIPs for same E-Board. E.g. Elastomer for "characters" and Capacitive for "scroll" key, etc.

But preferred DIPs, are:

A7—Touchscreen keyboards—can be made Thin, Light and LAF.

Their transparency can be utilized for an interesting E-Board introduced here.

They can be programmed to take various markings, and key arrangements.

A8—Thin Film Capacitive DIP—Can meet all criteria.

Capacitive Sensing Circuit can be printed on or embedded in very thin layer(s) of film or board, such that touch or even proximity of finger on certain points on it changes the capacitance at such point, which change is detected by the processor.

It can be ultra thin, less than a fraction of mm, can be transparent, has no moving parts, And can be programmed to take various markings, characters, arrangements, etc.

A9—Elastomer Dome Arrays or Elastomer Keypads—

They are used in many keypads such as dialers.

Typically do not have any of above criteria, but can be modified, using techniques described here to meet all criteria, and provide extra benefits too.

Their advantages are low power consumption, operable by a few square centimeters of photo cells, low cost and ability to have tactile feel Section B—Reducing "Thickness" of the E-Board:

There are numerous advantages in making the E-Board "thin", such as

Less volume for mobility, especially pocket portability, particularly alongside MCC Possibility of adding it to MCC, and still fit into a pocket Easier folding—a thick board is too bulky if folded Typically less weight To make the E-Board "thin", we observe that:

A DIP typically has Keys, Circuit Board, Electronics and Output Connector.

Therefore, we eliminate or reduce the thickness of said components, as follows:

B1—Dealing with problems of keys

"Key" is used here as a conventional key on a conventional desk or other keyboard Keys have noticeable thickness, volume and weight, each reducing portability.

Key's fragile mechanical/moving parts, reduce reliability, sturdiness, washability, etc. Keys have "height", making the keyboard thick, hence awkward to fold.

To reduce thickness attributed to keys, following techniques can be used:

B1.1—Using a "Keyless" DIP. Most DIPs in section A, are Keyless.

Thus "key"s are replaced by "Node"s being the sensitive to touch islands on E-Board. A "Node" is a small area on the E-Board that must be touched, approached or pressed (depending on its Digital Data Input System or Platform), to be activated and cause the E-Board to signal a character or function to the MCC.

A Node here will also represent a key if thin keys are used in the DIP.

Touching the E-Board outside a Node should not signal any character.

F1-22 shows a Node by a white circle.

A "Character Node" is the Node that signals a particular "character" such as "D".

B1.2—Eliminating the "Cap" portion of the keys in Elastomer keyboards.

Alternatively the "Cap" may be made thin, say less than 0.5 or even <0.2 mm.

B1.3—Making Mechanical keys to have minute thickness, weight, volume & bulk.

Not a good choice for E-Board, but may appeal to conventional typists.

B2—To reduce the thickness of "electronics"—such as processors, transistors, diodes, resistors, capacitors, etc. following techniques can be used:

B2.1—Choosing all components as thin as possible and desirable. Some components can be less than one Millimeter (mm), and others less than half or <a tenth of mm.

B2.2—Compacting some or all of the electronics into one or more into chip(s).

Such chips are called Application Specific Integrated Circuit (F1-24), or ASIC. ASICs can be thinner than one, even <half mm.

B2.3—Placing some or all of the thicker than desired electronic components:

B2.3.1—inside the MCC, so that working body of the E-Board becomes thinner

B2.3.2—On a separate chip, which chip can be fixed or detachable

B2.3.3—On the Output Connector, which may be fixed or detachable from E-Board

B2.3.4—On locations where their thickness has least undesirable effect

B2.3.5—On any device that may be used to hold a Detachable E-Board to MCC.

B2.3.6—Any logical combination of techniques in B2.3

B2.4—Any logical combination of techniques in "B"

A Preferred Version for both Integral and Detachable E-Board is B2.3.1.

A Preferred Version for Detachable E-Boards is B2.2 Combined with B2.3.5.

B3—To reduce the thickness of Output Connector (F1-26)—we can:

B3.1—Construct it from thin materials and components, such as "cable band" or "flex".

B3.2—Shrink it, by making E-Board Integral and Attached to E-Board

B4—To reduce the thickness of Circuit Board, techniques in B4 can be employed. Circuit Board (F1-28), is the board on which a typically thin "Circuit" is printed.

It usually underlies the "Keys" and harbors the "Output Connector".

Printed Circuits are thin. But the Board must be made thin. Thickness of the "Board" can be reduced by making the "Board" from one or more layers of thin material, such as (B4.1 is preferred):

B4.1—Thin Films, one group is known as Flex, one type of which is Kaptan

B4.2—Any other suitable thin flexible board

B4.3—Any suitable thin rigid Printed Circuit Board (PCB), if flexing is not an issue B4.4—Thin sheets of Elastomers or Rubberlike material (such as Silicone or Latex)

B4.5—Any logical combination of materials in B4

For example, rigid thin board for most part but flexible film for folding parts

B5—Using a suitable DIP that is or lends itself to being made thin, such as those in A.

B6—Any logical combination of techniques in "B"

Using the techniques in B, it is possible to reduce the thickness of the Integral E-Board (IEB), to well below two, one or even 0.5 of mm.

In IEB, Output Connector is shrunk and the "electronics" is inside the attached MCC.

In Detachable E-Board (DEB), the thickness of working surface and/or the Circuit Board, can be reduced to below two, one or even below one half of mm.

DEB "electronics" can be reduced to below one mm, or even below half mm thick. DEB Output Connector can be made less than one mm or even half mm thick.

But Output Plug (F1-30) or the tail end of Output Connector which enters the MCC has to conform in shape and thickness to the MCC Input Port.

MCC Input Port (Jack) can also be designed to accept very thin Output Plugs.

For MCCs that do not accept a thin Output Plug, Output Plug (OP) can be made "detachable" from Output Connector, for transportation.

Thus the rest of the Output Connector can be made thin.

Most of above thickness reductions have actually been achieved in prototypes made. For Integral E-Boards, thinning of the Working Surface Area only is needed.

Since E-Board adds negligible weight or volume, which is largely offset by the reduction in bulk it provides by replacing the MCC cover, it is safe to assume that most MCCs will soon use an Integral E-Board.

External/Detachable E-Boards will be used for older MCCs without an Integral one. Likely all Detachable ones will be off circulation after a few years.

So, thinning of the Working Surface Area of E-Board is of much more importance.

Figure 25:
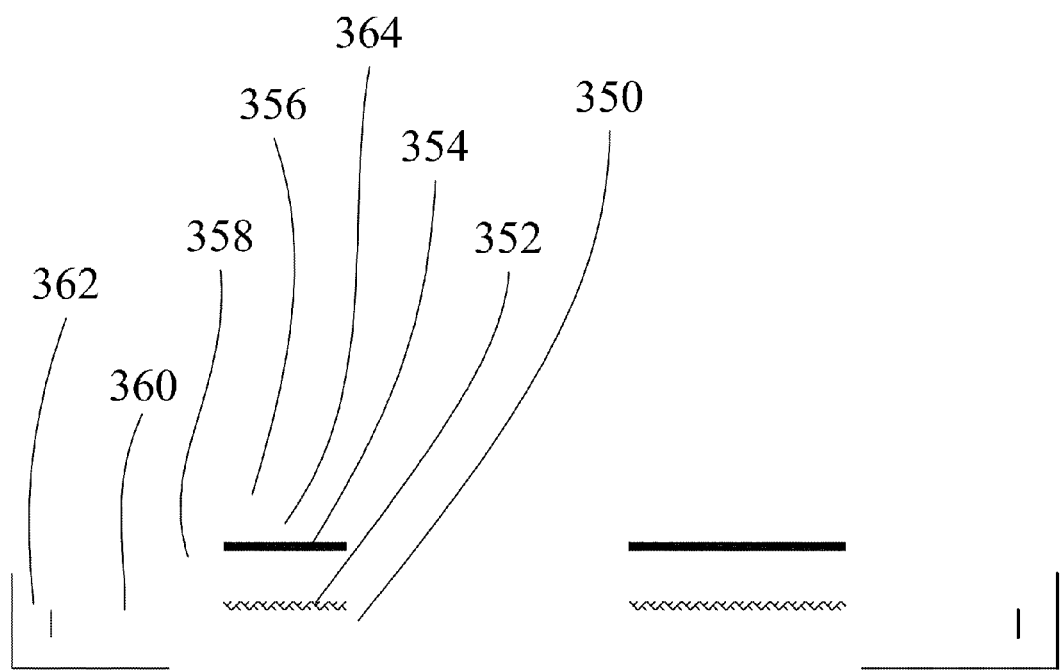
FIG. 25 shows a cross section of an abridged Elastomer Keypad In this description FIGS. 1, 2, . . . are often referred to by F1, F2, . . . .

Thinning an E-Board—Example:

FIG. 25 shows the cross section of a typical Elastomer Keypad, also called Elastomer Dome Array. Even though it is not used in very thin form in practice, not intended to be thin and in fact many attempts have been made to make it very thick, without side effects such as making keys wobbly. Thinning is possible as follows:

Printed Circuit Board (F25-350) can be made of suitable, stiff but thin material. One such material is called FR4. A layer less than 0.25 mm can be strong enough to hold the E-Board for hand held use, not relying on any desk or MCC support.

PCB can also thinner than a fraction of mm, such as flexible circuits, say to make a foldable multi-pad E-board. In such case, a supporting layer need be adhered to the Unfolding areas to make it Structurally Self Supporting, as elaborated later.

Such a layer can be a 0.25 mm thick FR4 or similar.

Elastomer Pad F25-358, can be less than 0.4 mm and yet be functional.

Circuit F25-352 is of micron thickness in a typical PCB.

Pill or Puck F25-354 can be "conductive ink", of micron thickness.

"Travel" or Distance between Pill and Circuit can be as low as 0.1 mm.

But to reduce false activation 0.2 mm is advised.

Adhesive layer F25-360 is less than 0.1 mm, but not by itself thickening as it contributes to and is less than "Travel".

Cap F25-356 is not essential, as a stiffer choice of Keytop F25-364 can suffice.

If preferred, Cap can be a stiff thin layer less than 0.2 mm including its adhesive.

Clamp, F25-362 to the rim of the Elastomer Pad which rings around PCB to hold the Elastomer Pad in place can be excluded, due to adhesive F25-360.

It is needed only for "removable" version of Elastomer Pad layer.

Conventional Elastomer Dome Arrays (another name for Elastomer Keypads), also have a to layer called "Bezel", with holes to let keys, which are typically tall, due to a thick Cap, out and accessible to fingers.

This Description suggests removing the Bezel, reducing thickness, weight and cost.

Conventional Elastomer keypads also have long pins attached to their undersurface. Pins are for accurate positioning of the Elastomer Pad over the PCB.

This Description removes said pins or makes them shorter than PCB thickness.

Instead, careful adhering of the Elastomer Pad to the PCB is possible.

This reduces thickness, somewhat weight and cost.

Hence an E-Board using Elastomer Pad as its DIP, can be thinner than One mm. This is around the thickness of a credit card.

For "tactile" feel, "Travel" must be more, adding say 0.5 mm, for a total of 1.5 mm.

Even if many of desirable features are added, below 2 mm thickness is possible.

For External Elastomer E-Boards, thinning of other components have been treated.

A typical Elastomer Keypad is around 6 mm thick without being "Stand Alone".

Some Stand Alones introduced recently are around 10 mm thick.

One can see the many times thinning improvements by using suggestions here.

Just making a thin input device does not make an E-Board.

Making an input device small, yet multi finger is a serious challenge.

B.b—Making the E-Board "light".

B.b.1—All techniques above to make E-Board thin also make it light.

B.b.2—All techniques in "B" above, re-worded by using "light" instead of "thin", can be applied for making the E-Board "light".

There is no need to repeat all reworded version of B.

Subsection B.b has been devoted to this topic, to avoid unnecessary duplication.

Same techniques will also reduce volume and/or bulk.

Techniques to reduce thickness of keys also deal with weight of keys.

Using techniques in "B", an E-Board having some 70 large, well spaced Nodes can be made weighing less than Fifty Grams or even less than 20 g.

Section C—Making E-Board Small (Yet Functionally Big)

Reducing the Working Surface Area (WSA) of E-Board.

The smaller the surface area, the more pocket portable an E-Board will be.

WSA is made up of Nodes, each having useful and redundant surface areas, plus useful or redundant areas between or around Nodes.

Following techniques can be used to reduce WSA.

C.1—Techniques to Optimize Node's Surface Shape (NSS):

C1.1—Round Nodes.

The joint plane of a finger and the surface it touches, is called "Finger Print" here. Finger Print is "round". Therefore Round Nodes have less redundant surface area.

Compared to typical square Nodes (or keys), Round Nodes that match Finger Print:

have less area have less material, bulk, weight, volume, etc.

can be more tightly arranged

Round does not necessarily mean circular.

C1.2—Nodes to resemble in shape the Finger Print of a typical associated fingers.

C1.3—Nodes operated by thumbs, to have a surface, resembling Thumb Print.

Thumb lands usually sideways on the Node and has an "Oval" print.

So a preferred Node for Thumb is Oval, with an almost vertical axis

C1.4—General Optimization of Node Shapes.

Mathematical, Computer or Visual techniques can be used to "optimize" Node Shape.

Hexagon, other Regular or Irregular shapes should be examined.

Whether or not conventional shapes are optimal should be examined, not assumed.

In Optimizing Node shapes, following factors should also be considered:

Each E-Board has its own unique use, dimensions, constraints, etc.

Nodes need not have similar shapes nor sizes

"Unintended Node Activation" or UNA to be minimized

The goal is to reduce overall area of the E-Board, not necessarily each Node C1.4 is for completeness, in case pre-determined shapes are not optimal. Special circumstances may warrant using ingenuity to optimize Node shapes. Optimal shape of keys cannot be predetermined for all uses in this application.

C1.5—Circular Nodes—

This is a preferred version, and serves most purposes better than other techniques.

They can be arranged side by side most efficiently and easily.

They are generally the best option, except for Thumb and some other Nodes.

C1.6—Regular (Six Sides of Equal Length) Hexagonal Nodes—

Another preferred version. It is an optimal shape in the sense that up to six same size Nodes can surround each Node, and that a collection equally size regular hexagons does not use more total area than a collection of equal Circular nodes.

(This assumes diameter of each circle is the same as the span between parallel sides of each regular hexagon.) This is because circular Nodes side by side tight collection leaves an empty quasi-triangular holes between each 3 neighboring circular Nodes. But tight arrangement of said hexagons does not leave any holes between them.

C1.7—Any logical combination of techniques in "C1"

A Preferred Version is "Circular" Nodes for most characters Nodes.

Thumbs Nodes to be one almost vertical Oval or sum of more Ovals side by side.

Nodes such as "enter" to be enlarged using Voids or custom designed.

C2—Electronic Reduction of Unintended Node Activation or UNA.

This section introduces a technique for reducing or eliminating the need for any margin between nodes and also enabling very small but easily activated nodes to be compactly placed, yet be operable without too many mistaken activations.

The technique(s) in this section are applicable to all Digital Data Input Devices.

Just replace key or another equivalent word for Node, and replace Computer or other Receiving Device for MCC, to generalize teachings in this section.

Smaller Nodes arranged "closer" to one another leads to a Smaller WSA.

All DIPs in section A allow very small Nodes, even less than few mm in diameter.

But close arrangement of Nodes results in each touch activating more than one.

Section C offers Three categories of techniques to reduce or eliminate UNA:

C2—Electronically—Processor and/or Driver to registers only one of activated Nodes C3—Spatially—Optimizing the Distances between Nodes C4—Structurally—Barriers for one finger to touch more than one Node concurrently Prior art, by design or default, addresses UNA in mini keyboards and keypads, via High Activation Force, so that one finger cannot easily touch many keys.

If each key needs 150 grams, pressing 4 keys simultaneously takes 600 grams.

This method reduces speed, fun and duration of a bearable typing session.

Reduction and especially elimination of UNA, also increases speed, as the operator need not pinpoint the intended Node nor ensure avoiding adjacent Nodes.

E-Board Processor/Controller and/or Driver or MCC Operating System or the like, can be programmed to only register one of the Concurrently Activated Nodes.

The software should determine:

"concurrent", by some designed criteria, say Nodes activated within a short time "order", say first, and perhaps second, etc activated Node(s)

"intensity" of activation, such as, "capacitance change", "area touched", "pressure applied", "resistance change" or "other" depending on DIP, or some "logical weighted combination of intensity measures"

"proximity" of Nodes, such as "adjacent", "close", etc

"duration" that each activated node was constantly touched

"other" measures, suitable to DIP, use and other factors

Then an algorithm of designer's choice registers the "Intended Activated Node". Variety of algorithms that can be designed are numerous.

One example algorithm is:

identify all Nodes activated within say 0.1 second of each other i.e. "concurrent"

choose those nodes activated with a predetermined minimum "intensity"

accept those simultaneous touches that are by design, such as Shift+Node register the "first" activated node from total of those chosen and those accepted the previous step Thus ensuring only one of the Nodes touched is registered for each finger strike.

Over time, the operator becomes accustomed to the algorithm, how best to operate.

Using above techniques, more than 60 Nodes, each less than a few mm in diameter, packed on a surface much smaller than a credit card, can be operable without UNA.

Combined with Thinning and LAF techniques herein results in a tiny but good E-Board.

C2 Technique adds no thickness nor weight to E-Board, hence a preferred one.

C3—Reducing/Eliminating Excesses in Inter Node Gaps

An Inter Node Gap (ING) (F1-32) is the distance between a point on the perimeter of a Node and a point on the perimeter of an adjacent Node.

"Zone"s between Nodes are "insensitive" or "inaccessible" to finger touch

A Minimal Inter Node Gap (MING) is the minimum ING between two adjacent Nodes.

A Sufficient SMING is a MING, wide enough, to reduce to acceptable level, the occurrence of one finger activating adjacent nodes corresponding to said MING.

One way to reduce UNA is to make MINGs wide enough.

But wider MING increase overall working surface area (WSA) of E-Board.

To reduce WSA and UNA one should Optimize INGs, not just minimize.

The goal is Reducing or Eliminating any "Excesses" in INGs.

One technique is to imagine "Node Border Margins" (F1-40) around each Node.

Then ensure that such imaginary NBMs do not overlap.

NBMs are parts of Zones necessary to ensure SMINGs.

Voids, or areas not covered by any NBM on the Zones are not even necessary.

The width of NBMs can be less than half the diameter of a Finger Print.

In most DIPs, the center of each Node should be touched for activation.

Touching the inner periphery of a Node does not usually activate it.

Therefore, even if MINGs are slightly less than a Finger Print span, one finger won't easily touch the centers of two Nodes concurrently.

If other techniques introduced here to reduce UNA are employed, minimum distance required between adjacent Nodes can be further reduced.

Such other techniques can reduce SMING to negligible or even to zero.

Perimeter Nodes, not bordering another Node on one (F1-34) or more sides (F1-36), need a "narrow" Perimeter Margin (F1-38) between them and closest E-Board edge.

Perimeter Margins less than 2 mm wide are usually enough.

To minimize the working surface area, one should ensure that boundaries of adjacent imaginary "Node Border Margins"s (NBMs) are, so far as possible, "tangential".

One should also arrange nodes as compactly as possible, without overlapping NMB.

A Preferred version is to surround each Node by a 3.5 mm wide NBM (F1-40).

Then arranges Nodes tightly ensuring that such imaginary NBMs don't overlap.

This maintains a minimum Distance of 7 mm between perimeters of adjacent Nodes.

If Nodes are 10 mm wide, Node centers will be some 17 mm apart.

Almost the Distances between centers of conventional keys, but optimal for pocket.

Perimeter Margins of a preferred embodiment is 2 mm.

C4—Reducing the Sufficient Minimal Inter Node Gaps

Sufficient Minimum Inter Node Gaps for "acceptable" UNA can also be reduced by following techniques or types of Nodes:

C4.1—Walled Nodes

One can reduce Unintended Node Activation (UNA) by placing a "Ring Wall", continuous (F1-42) or Discontinuous (F1-44), around each Node.

Adjacent Nodes, surrounded by Ring Walls are difficult to touch concurrently.

Ring Walls can be less than a couple of mm high and less than a couple of mm wide.

Even Ring Walls a fraction of mm (high) with a fraction of mm width are effective.

Walled Nodes can be arranged like honey combs, with little chance of UNA.

Walls (Grey ring F4-180) should preferably be:

Tall enough to prevent one finger touching Nodes on its either sides

Short enough not to prevent touching of one Node at a time

Thick enough, especially at the base, not to fall or bend under repetitive finger strokes Long enough not to bend under finger pressure, and to encircle enough of the Node Numerous enough to encircle sufficient section of perimeter of each Node Rigid enough not to yield to finger pressure.

Located preferably between adjacent Nodes where said Nodes are closest

Preferably mountain shaped, (wider base but sharp top), to ease touching the Node.

Walls reduce accidental activating of Nodes too, by making it difficult for a stray unintended finger to touch a Node.

Walls can be continuous all around the Node, creating a "cell".

Walls forming regular hexagons around each Node, give a "honey comb" effect.

Walls can be Discontinuous (F4-182), covering strategic positions between Nodes.

Elastomer DIP Nodes can be "walled" by stiffening their perimeter walls (F25-358).

But Each Node's top skin (F25-364) should be sufficiently soft and stretchable).

Such Nodes will look like "drum"s, which top skin caves downward to active it.

But their stiffer walls prevents one finger to cave down more than one Node top.

For Membrane, Thin Capacitives, Touchscreens, Elektex, or other flat surfaced DIP, walls can be planted on their surface.

Also an Elastomer Layer as described herein, can provide removeable walls.

Mechanical Keyboards cannot be walled without overbulking.

Dimensions in F4 are examples only, but demonstrate a preferred version.

Preferred Version: 6 walls each 2 mm thick×3 mm long×2 mm high, each located at tangent points between closely packed 10 mm diameter circular Nodes.

Over 70 Nodes can be arranged on a rectangular E-Board smaller than 75×125 mm.

C4.2—Bowl or Well Nodes:

Are Nodes below the E-Board working surface, such that the finger must touch the bottom of a "Bowl" or "Well" to activate the Node. It is more difficult for same finger to reach the bottom of adjacent Bowls concurrently. Hence UNA is reduced.

It is also difficult for an unintended finger to reach the bottom of a Bowl or Well.

So accidental activations are also reduced.

Adding a thin layer over the E-Board working surface, with holes to expose the Nodes for touching is one way of achieving this.

The modified Membrane Keyboard, taught in this Description, with an Elastomer Membrane, can easily have Bowl Nodes, by thickening the layer that keeps the Membrane distant from the underlying circuit (distancer or separator).

Conventional membranes do not stretch. So a thick distancer increases AF even more.

F19 shows the arial view of a Pad of Bowl Nodes.

Inside the bowl is sensitive (F19-190, white circle), except for a narrow rim (F19-192). Bowls should be concave enough or deep enough, so that when each two are placed close to each other, one finger cannot touch the sensitive inside of both simultaneously. Such Bowl Nodes, can be placed touching rim to rim. A honeycomb appearance.

A Preferred Version: 10 mm Diameter Circular Bowl Nodes, 2 mm deep.

70 Nodes can fit on a 75×125 mm E-Board. Dimensions in F19 are examples only.

Walls & Bowls add to thickness, but allow more Nodes to be packed on a small area. This can reduce the need for multi-pad E-Board, thus reducing the overall bulk.

Walls and Bowls also provide feedback when finger touches the Wall or Bowl rim.

C5—Optimal Arrangement of Nodes, Over the Working Surface of E-Board:

C1 optimises the Nodes shape, in particular suggests Circular Nodes for fingers

C2 teaches how to reduce or eliminate Unintended Node Activation in tiny E-Boards C3 minimizes the "excesses" in Inter Node Gaps.

C4 reduces the Sufficient Minimal Inter Node Gaps.

C5 is to minimize sizes of "Voids" (F1-46) or "Redundant Areas Between Nodes".

C5 teaches "optimal" arrangement of Nodes to reduce Working Surface Area.

This can be done on a custom basis depending on size, shape, number of Nodes. Also considering size and shape of E-Board working surface.

Visual, Analytical and Computer optimization techniques can be employed.

The technique that works well in most circumstances is as follows:

Assume an "imaginary" Node Border Margin" (NBM) (F1-48) around each Node. Widths of said NBMs to be half the Sufficient Minimum Inter Node Gaps.

Arrange the Nodes, as tightly as possible, ensuring that their NBMs don't overlap. This ensures SMINGs. Yet reduces Voids.

Final visual or analytical modifications may further increase overall utility.

Equal sized Circular or Regular Hexagon Nodes, surrounded by such imaginary NBMs, arranged in said manner results in a Diagonal Arrangement of Node.

Each typical Node can be surrounded by and tangents up to six others.

On a rectangular E-Board surface, having vertical/horizontal sides, lines connecting centers of adjacent Circular Nodes forms an almost 60 degrees angle with said sides. Centers of any three tangential said Nodes forms an triangle with equal sides.

Combination of "Circular Nodes" and said "Optimal Nodes Arrangement" results in:

Substantial reduction in total area of "Voids"

Substantial increase in number of Nodes that can be placed on E-Board

Substantial increase in allowable size of Nodes and INGs

All above without increasing UNA

Ditto for Regular Hexagonal Nodes or equal size.

Combination of Circular Nodes & Optimal Nodes Arrangement is not obvious.

Conventionally, even circular keys are arranged vertical/horizontal with large Voids Conventional square keys, even if arranged diagonally, will not reduce Voids.

A Preferred Version uses equal size Circular Nodes arranged diagonally and tightly on a rectangular E-Board. Thumb and/or special characters Nodes are custom designed.

C6—Some modifications can be made to make a "minority' of Nodes different.

Said minority can have different shape, size, ING, etc than remaining majority.

Such deviation from general rules can lead to a better E-Board, by making some of more frequently used nodes more easily operable.

Said modification can have no or minimal overall enlarging of Working Surface Area, if done in a way that only reduce Voids, or done by merging adjacent Nodes.

C7—Any logical combination of techniques in "C".

C.b—Making E-Board Multi Finger Operational (MFO)

To enable several fingers to operate the E-Board together, the distances between centers of adjacent Nodes must be preferably larger than the width of operator's finger. Keyboards that allow touch typing provide a range from around 15 mm in compact ones to 19 mm in standard desk variety.

This means Nodes that are large and/or far enough, without overshooting. Nodes Sizes and/or Inter Node Gaps should be modified to make distance between centers of adjacent Nodes suitable for MFO, generally between 15 to 19 mm.

If centers of adjacent Nodes are too far, MFO will be compromised, as adjacent fingers can't conveniently aim at adjacent Nodes.

Section C can be used to make a functional E-Board smaller than a credit size, with little or no chance of activating the wrong Nodes, but does not focus on MFO.

Section "C.b" teaches making an E-Board small enough, say to be pocket portable, but not necessarily smallest possible, to be capable of Multi Finger Operation.

As the same techniques as in section C are modified, it is classified as C.b.

Section "C" teaches how to reduce Working Surface Area (WSA).

By analogy, same techniques can be used to enlarge the Nodes and/or the Inter Node Gaps. Hence increase the distances between centers of adjacent Nodes.

All to be done within a preset, say pocket portable WSA.

Alternatively, even if Nodes and/or Inter Node Gaps between them need to be enlarged for MFO:

optimising the shape for most Nodes (such as Circular)

optimising the Inter Node Gaps optimising the Arrangement of Nodes (such as Diagonal for Circular Nodes)

or/and other techniques taught in C will Optimise the Number of Nodes on a preset, say pocket portable WSA.

Or predetermining the sizes of Nodes and Inter Node Gaps to suit Multi Finger Operation, and applying above optimizations, will result in Minimal Functional WSA.

D—Enlarging the E-Board and/or Increasing the Nodes

Ways of making the E-Board, Thin, Light & Small, yet Good Size with Optimal Number of Nodes and Multi-Finger Operation, were explained separately.

Such E-Board can fit in a small pocket, even if accompanied by a much thicker MCC. For even More or Bigger Nodes, techniques are:

D1—E-Board working surface area can be enlarged, by reducing pocket portability. But being Light & Thin makes it portable in a large pocket, folder or briefcase.

E.g. a Detachable E-Board some 8 cm×26 cm or just over a third of a page, with 70 large, well spaced Nodes, thinner than 2 mm overall, carriable inside a file or folder.

D2—Double Sided E-Board. Placing Nodes on both sides of E-Board to double WSA.

Such an E-Board can be placed between hands for two hands, all fingers operation.

An MCC held by a strap or some fingers leaves free fingers to operate it.

D3—Using the unused back of MCC, for E-Board.

This increases the total WSA to place more or larger Nodes.

A special MCC holder can release fingers to operate the back of MCC.

Having any additional Node or any Fingers to operate them is very important in MCCs.

So far we have discussed One Pad E-Boards.

If a One Pad E-Board is pocket sized, preferably below 75×130 mm, it may be referred to as an E-Pad.

E—Multi Pad E-Board (F2)

For More or Bigger Nodes than is possible on a single Pad, E-Board can be divided into two or more Pads (F2-62) or Sub-E-Boards or SEBs.

Multi-Pad E-Boards can be pocket portable by any of following techniques:

E1—Each Sub-E-Board (SEB) "detachable" for stacking and storage.

Since each SEB is pocket size and thin, the stack is pocket portable.

"Thin connectors" should be used for attachment/detachment of SEBs.

E2—Some or all SEBs "foldable" over each other, for transport/storage.

Making each SEB pocket size, while thin, makes the folded E-Board pocket portable.

Special "electro-mechanical" hinges should be used connecting SEBs at fold lines.

E3—Some or all SEBs "curveable" along their common sides (F10).

Hence E-Board can wrap around the MCC, and the combination is pocket portable.

A 2-Pad E-Board (F10-72) can curve at the middle (F10-74) around MCC (F10-76).

E4—Some or all SEBs can be "directly" Attached to or Detachable from the MCC.

Instead of connecting all SEBs to each other, some can connect directly to MCC.

E5—Some or all SEBs "directly" attachable to/detachable from the Output Connector.

Two Pads can be detached from each other, but each connected to OC.

E6—Some or all SEBs attached to and foldable over or curveable around the MCC.

E7—Separate Electronics Chip (SEC) to house some or all of the thicker components.

SECs can be one or more SEBs, detachable, foldable or curveable for transport.

E8—Output Connector can be one SEB, Detachable from or curveable over other SEBs.

E9—A SEB can be placed at the back of MCC

E10—Any logical combination of techniques in E.

For example, E-Board can have a Detachable SEC, a Curveable Output Connector, and two Pads Curving at their junction around MCC, used also as a two sided cover.

Preferred Version1:

Integral E-Board with two SEBs, one attached to the left-side & another to the right side of MCC, both curving over the face as a cover, but open up for use.

Preferred Version2 (F2): 2-Pad Detachable E-Board, curveable at Pads' common joint.

For transport it can wrap around MCC in a pocket or be unfolded for say a file holder.

F2 shows a 2-Pad E-Board. The Fold Strip (white rectangle F2-64) has no Nodes.

Fold Strip may have Connecting Lines (F2-66 &68) connecting the Pads' circuits.

Fold Strip can fold or curve around an "imaginary" Circuit Fold Axis (CFA)—(F2-60).

Each separable or foldable segment of E-Board is called a Sub-E-Board (SEB) here.

A SEB can be a "Nodes Pad", "Output Connector", "Photo Cell Sheet", etc.

SEB is either Detachable from or Foldable/Curveable over an adjacent SEB or MCC.

Section "F"—Making E-Board Low Activation Force (LAF)

If pressure needed to activate Nodes, called Activation Force (AF) is high, say above 70 grams, then fast, comfortable or touch typing is difficult or even impossible.

Fast typing requires light touch, multi finger operating and minimal hand movement. Low Actuation Force (LAF) makes even one finger typing much faster and easier.

High AF requires concentration of force in one finger, decommissioning other fingers. This results in exclusive use of the pointing finger and moving of hand from key to key. That is why cell phone keypads must be dialed slowly by one finger (OK for dialing).

It makes E-mailing, Word-processing and Computing very slow and tiring.

One reason High AF slows typing is that it takes longer to exert pressure on each Node than mere touching. LAF is much faster even if just one finger is used.

Another reason Height AF slows typing is that several fingers can't operate together. Typically, Keypads or Mini keyboards use one finger or two thumbs, one at a time.

High AF makes typing tiring, causing keyboard avoidance and short typing sessions.

To make E-Board Low Actuation Force (LAF) or Touch Sensitive (TS), we use:

F1—DIP which is inherently TS or LAF, from section A, such as Capacitives.

F2—Choosing the TS or LAF from the range available in the chosen DIP.

E.g. Elastomer Keypads have a wide range of AF from 10 gr to 300 gr to choose.

F3—Making Physical and/or Electrical modifications to DIP to achieve LAF, s.a.:

3.1—Making their electronic measurement system sensitive to LAF 3.2—Reducing distances which need to be closed by pressure for activation 3.3—Using materials sensitive to LAF in their construction 3.4—Other measures, depending on their technology 3.5—Any logical combination of techniques in F3

E.g. Techniques to make Touchscreens LAF are known to the skilled.

F4—Using an Elastomer Sheet as the "membrane" in Membrane Keyboards. Conventional membrane switches using a non-stretch membrane are High AF Reducing the key (downward) travel is one current method of reducing AF.

But it makes the key vulnerable to false registration. Another method is to make larger keys, which enlarges the keyboard countering our attempts to shrink it.

Neither methods reduce AF to our desired level reliably and faultlessly.

This Description introduces the use of a membrane made of an "elastomer" such as Silicone, Latex, Urethane, Rubber or other Rubberlike material.

Since elastomers stretch, little force is needed to cave them down to activate the key. Since elastomers retract (or restretch), release or deactivation is automatic.

Making the underside of the elastomer sheet conductive is possible using conductive ink, conductive paint, conductive particle doping, metal foil or other known methods.

F5—Any logical combination of techniques in F

G—Making E-Board Faster

Some of factors that contribute to faster typing are:

1—Reduced chance of unintended Unintended Node Activation.

Thus the operator does not have to pinpoint the intended Node.

Also, less corrections of wrongly activated Nodes are necessary.

This speeds typing in one finger, two thumbs or multi-finger operation.

2—Low Activation Force, which increases speed even for one finger or two thumb operation and is important for multi finger operation.

3—Multi Finger Operation.

4—Efficient Allocation of Characters and Functions to Nodes

Above factors have been treated elsewhere in this Description.

G5—Ease of Locating Nodes

This is of particular importance in keyless, almost 2 dimensional Nodes of E-Board.

If Nodes look like isolated islands over a plain WSA, time is lost for each finger ensuring to land on the center of the intended Node.

This Description introduces a solution as follows.

G5.1—Divide WSA amongst Nodes, with visible, preferably raised (3-D) lines.

Said Lines preferably drawn through the center line of Inter Node Gaps

Said lines specifying the boundary of each Node's "Territory" (F22-304).

Thus fingers can locate "Tritory"s instead of pinpointing the Nodes within.

Yet, it is not very likely to hit a Tritory without activating the Node inside it.

Lines that are not through the center of Inter Node Gaps can also be drawn, to manipulate the shape, size, etc. of some Territories, for any desired result. Such Territorial border lines don't change Inter Node Gaps or position of Nodes.

But placing Nodes off the center of a Territory may reduce chance of hitting it when finger aims for the Territory.

F22-306 shows one Territory. F22-308 shows the active part or Node of a Territory.

F22 shows 35 Territories, each as large as desktop keyboard key, some like "enter" larger than most, all in less than a pocket PDA size of 75×125 mm.

G5.2—Make Nodes as larger, within bounds dictated buy needed Inter Node Gaps.

This increases the chance that a finger touching a Tritory to activate its Node.

G5.3—Divide the "Voids", between and merge them visually into adjacent Tritories.

Voids are redundant areas between Nodes excessive to needed Inter Node Gaps.

If Voids remain visible as separate islands on WSA, operators eyes wastes time screening them out before identifying the right Nodes.

G5.4—Allocate more Voids to more frequently used Nodes, s.a. "enter" (F22-302)

G5.5—Place Thumb operated Nodes, such as "space" on the Lowest Row on WSA.

This prevents Thumb activating lower Nodes, as it would do otherwise.

Thumb Node on Lowest Corner reduces its chance of hitting other Nodes (F22-300)

As it is difficult to direct the Thumb to any Node, special care is needed.

G5.6—Allocate more than one Territory to crucial symbols s.a. SPACE (F22-300)

G5.7—Preferably disguise Nodes, so that eyes don't search for them.

Eyes better search for as little as possible, in this case Territories and Markings.

G5.8—Logical combinations of Techniques in G.5

Note that not all need to be done, but doing any step should add to speed

Figure 21:
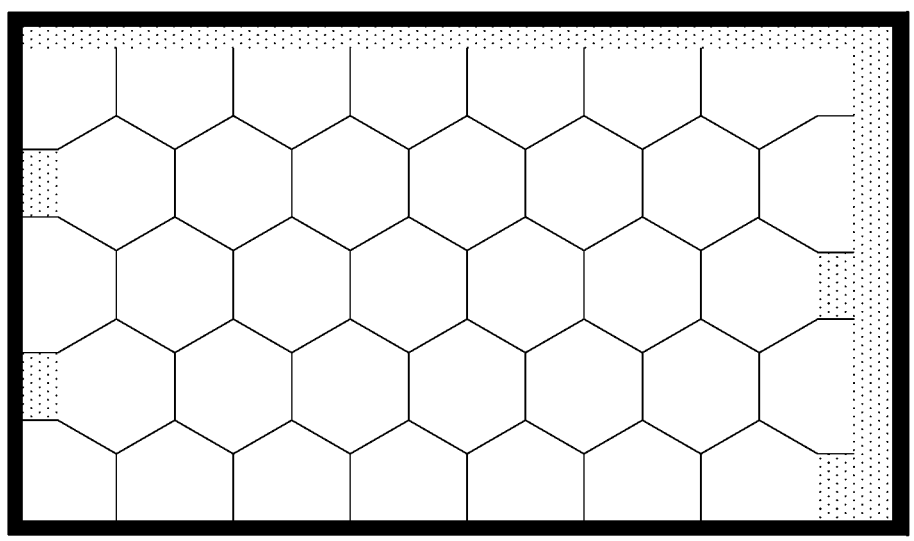
FIG. 21 shows an E-Board working surface area carved into mostly Hexagonal Tritories

One preferred version for Circular or Hexagonal Nodes is a Hexagonal Territory for each Node. Such Hexagons also encompass Voids. (FIG. 21)

Figure 22:
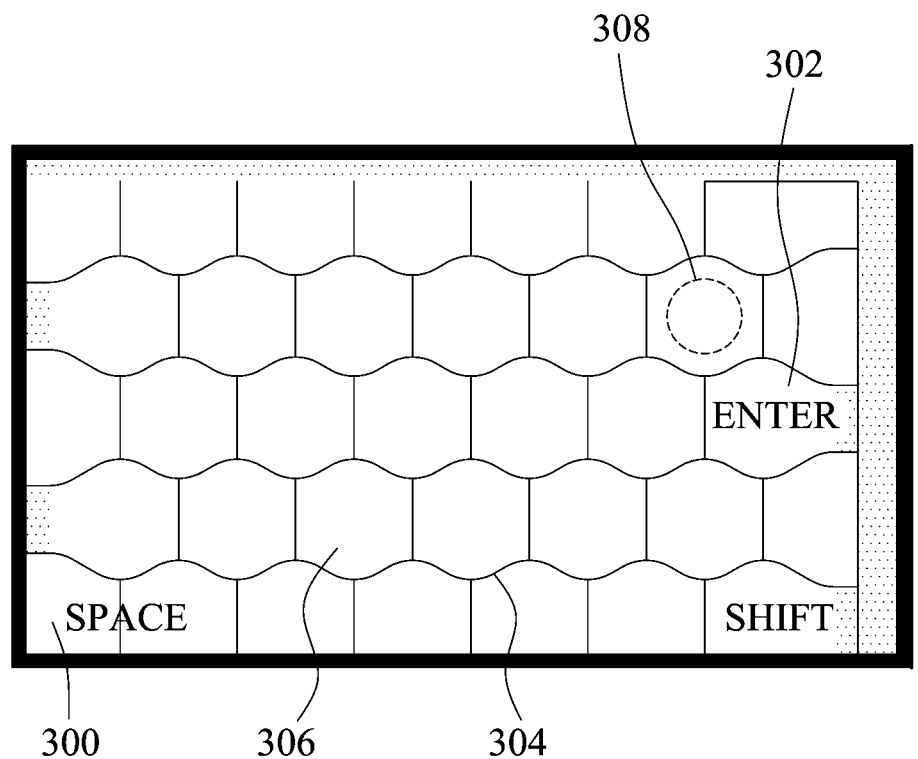
FIG. 22 shows a 1-Pad E-Board carved into some 35 Tritories
Figure 23:
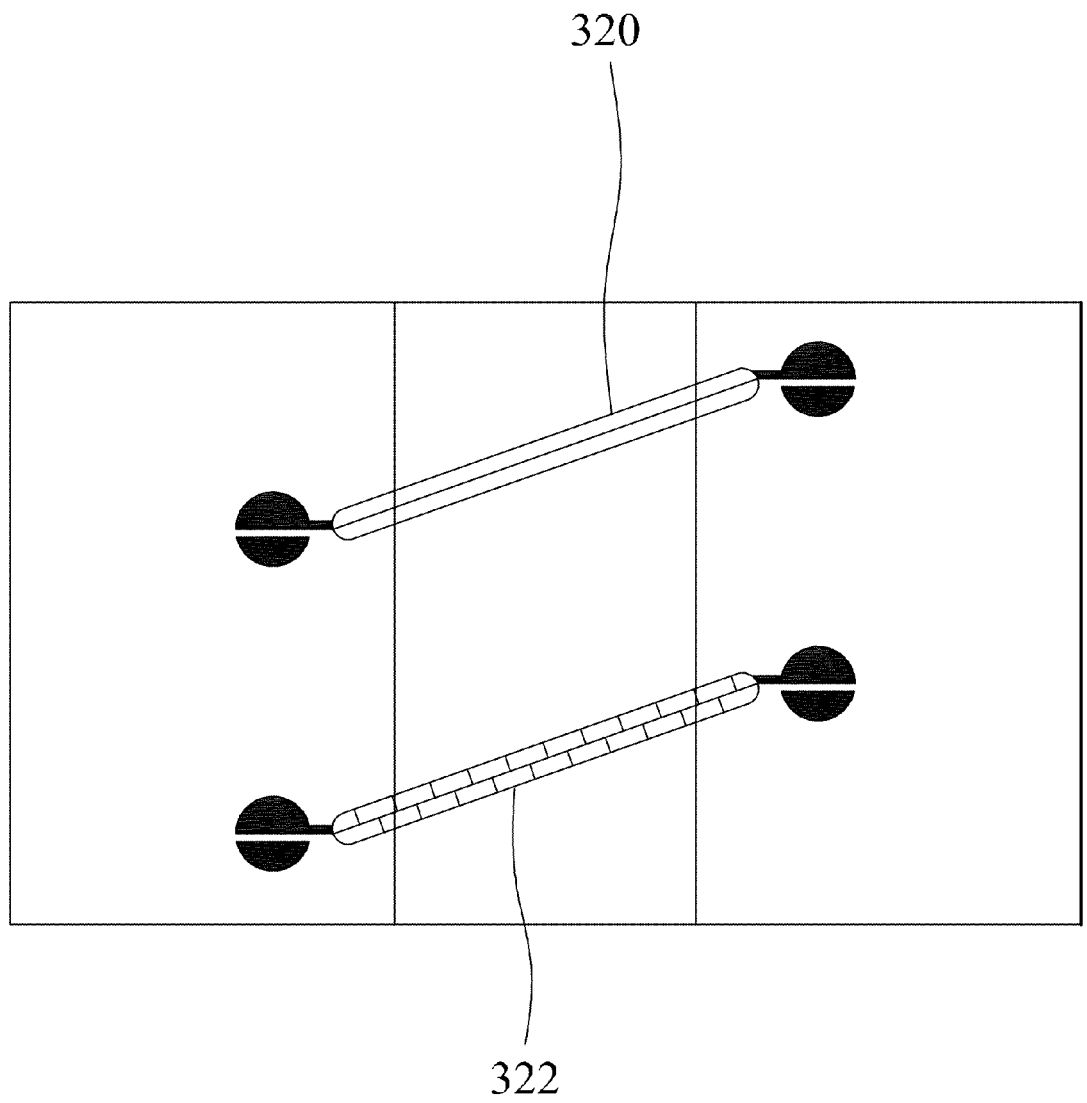
FIG. 23 shows Multi Line and Grid electrical connections from Pad to Pad

Another preferred version for circular Nodes is as in FIG. 22.

G6—Logical combinations of Techniques in G.

H—Efficient Allocation of Characters & Functions to Nodes

The most popular English keyset is called QWERTY. But its efficiency is in doubt.

Dvorak tried to increase efficiency by allocating the most used characters to Home Row.

This Description introduces another arrangement to increase efficiency, as follows:

1—Imagine placing a typical hand over an E-Board or Keyboard, to find the most convenient Node or Key for each Finger, referred to as "Home Nodes".

Home Nodes are likely not all on Home Row, as finger tips form an arc, not a row.

Research and experimentation can determine the most popular Home Nodes.

2—Determine the Most Active Fingers, by research, analysis and experimentation.

Alternatively assume their order by how close they are to Thumb.

3—Determine the relative use of characters and or functions or in general "symbols", by research, analysis and experimentation.

This may be different for different uses. For example, PDAs will mostly use the E-Board for E-Mailing, which uses a different phrases than a financial MCC.

4—Allocate Most Used Symbols to Most Active Fingers' Home Nodes in logical order.

5—Allocate remaining Symbols to Nodes that can be reached most easily from Home Nodes, applying, having priority for more active fingers home Nodes 6—Allocate remaining less used symbols to double touch set, such as Shift+Character In effect improve on Dvorak by distinguishing Home Nodes from Home Row.

I—Making E-Board Structurally Self Supporting (SSS)

Elastomer Dome Arrays, Membranes, Touchscreens, Thin Film Capacitives and the like DIPs are meant to rest on their receiving device for structural support.

In Typical uses Touchscreens are adhered to the screen. Membranes Switches are adhered to and rest on the usually industrial control device that uses them.

Elastomers typically rest on the body of say the remote control use them, etc.

Electromechanical Keyboards, rest on the body of laptops or a desk.

Electex Keyboard also has to rest on a desk or other support.

Applicant does not know any "stand alone" Membrane, Elastomer, Touchscreen or Thin Film Capacitive keyboard.

Elektex and Electromechanical keyboards are stand alone but rely on desk.

E-Board, though connected to MCC, electronically and physically, is not meant to rely on the MCC to prevent it from bending or breaking, under finger strikes.

Besides, E-Board, unlike the input devices that are attached to the receiving device, cannot rely on the protection of the receiving device or its carry boxes for protection needed when not in use say in pocket.

In fact, E-Board should be strong enough to protect the MCC if used as a cover. Without desk support, E-Board is either held in hand or by some kind of holder.

It should be strong enough to withstand holding force of any holder or suspender. With desk support, E-Board should be sturdy enough to be stand alone.

Also, its electronics should be protected from abrasion from desk, pocket, etc.

To make E-Board structurally self supporting, following techniques are proposed.

One is to make its underlying material sturdy enough.

Printed Circuit Board of Elastomer Keypads (a.k.a. Elastomer Dome Array), PCB of Membrane KeyBoard, Layer(s) of the Touchscreen or the Film in Thin Film Capacitive can all be chosen stronger, even if slightly thicker.

For example a 0.25 mm thick FR4 as PCB an be good enough.

Electronics or circuit lines should not be exposed on the back of E-Board.

If they have to be there, a thin protective layer should cover them.

Another technique is to adhere a thin but sturdy pad under the E-Board.

Such a pad makes E-Board self holding and protect any exposed electronics under it.

For example, a quarter mm thick FR4 layer can be strong enough for the job.

There is no shortage of alternative material, and better ones will be invented.

Thus, a touchscreen which is conventionally attached to MCC screen for support can become an E-Board that is like a flip cover on MCC side or detached from MCC.

As an example, a rollable Elektex keyboard that relies on desk for operation, if such a pad is added, can be used in hand. But it must also undergo other techniques in this Description to make an E-Board. It should become much thinner, lighter, touch sensitive, smaller (but with sufficient number of well spaced Nodes) etc.

J—Some E-Board Examples:

J.1—One Preferred Version (F1), uses Capacitive DIP, has 35 Nodes, each 10 mm diameter circles, arranged on a Rectangular E-Board surface smaller than 75×125 mm.

Minimum distance between perimeters of adjacent Nodes is 7 mm.

Hence little chance that a finger aimed at center of a Node hits the center of another.

In most DIPs, area close to center of Node must be touched for activation.

Touching periphery of a Node does not usually activate it.

So if finger touches peripheries of adjacent Nodes UNA will not necessarily happen.

In above Version, distance between centers of adjacent Nodes is 17 mm.

Thus ample distance between operating fingers, and little chance of Finger Jamming.

Allocation of characters to Nodes can be as desired, such as;

35 Nodes=26 alphabets+"space", "enter", "delete", "back", "shift", "control", etc.

For numerals and other characters, "shift" (say), can add another 35 symbols.

For even more characters, "alt" (say) can add another 35.

One hand operation of a 35 Nodes Pad means say 8 Nodes per finger, 3 for Thumb.

For two hands (desk) operation, a two Pad 70 characters E-Board can be used

J.2—Honey Comb E-Board—A Preferred Version

Nodes are all regular Hexagon, 9 mm from side to side, most compactly placed together, with no Inter Node Gaps between them. So the distance between centers of alternate Nodes is 18 mm, which is ideal for Multi Finger Operation.

Operator can choose Home Nodes to be 18 mm apart to avoid Finger Jamming.

It uses the "electronic technique" introduced for eliminating Unintended Node Activation. Each Node is surrounded by up to Six adjacent Nodes, as visual Inter Node Gaps. Due to above UNA avoidance, "insensitive" Inter Node Gaps are not needed.

70 Nodes can be placed on 99 mm×66 mm area, slightly larger than a credit card.

One hand cannot conveniently handle more than 35 Nodes.

Over 35 Nodes can be placed on less than a credit card size of 54×86 mm.

Using other techniques introduced here it can also be as thin & light as a credit card.

It can be Touch Sensitive and Multi Finger Operation for Touch Typing.

J.3—On Screen E-Board.

This description teaches making a Small Multi Finger Operation. One version follows.

We use Transparent (Touchscreen or other) DIP to make the E-Board.

We use Transparent color(s) such as pale Yellow or Grey dye, paint, layer or doping to mark for Nodes and/or Territories and characters.

When such E-Board is placed over an MCC screen, the screen is visible.

Transparent Markings can also be provided by software, to be cleared when not in use.

Such E-Board Working Surface Area can be as large as, the MCC screen or less. Such an E-Board can be removeable, when not in use.

Hence a well sized E-board which does not prevent function of the screen is created.

Most MCCs and Notepads have a Touchscreen covering much or all of their screen. Many have a tiny keypad programmed onto their Touchscreen.

But such keypads are tiny and/or steal from the scarce screen.

Transparent Markings, enables the Touchscreen keypad to be much larger.

Not stealing from the screen is an advantage for Notepads but crucial for MCCs.

This also enables a bigger screen for MCC, as the area allocated to tiny touchscreen keypad is not needed.

Also, adding an E-Board eliminates the need for all the other on screen input devices such as Handwriting Pad. It can eliminate the need for some off screen input devices, whose function can be delegated to E-Board, which also reduce the size of screen.

Thus the screen can be almost as large as all of the top of an MCC.

This in turn provides more area for the Transparent E-Board making it even better.

While conventional tiny touchscreen keypad is of little use, the Touchscreen E-Board described here can be a proper touch typing input device.

J.4—Multi Marked E-Board

This Description teaches how to pack a good number of Nodes into a credit card size or even smaller surface, yet prevent Unintended Node Activation.

It also teaches making a pocket size surface, Multi Finger Operation for Touch Typing. It teaches using different Digital Input Platforms, such as Touchscreen for E-Board.

Now it teaches use of Touchscreen or, Capacitive Transparent Thin Film, or any other programmable DIP to make a Multi Screen E-Board.

Software in the E-Board Driver and/or Firmware in its Controller/Processor or Operating Software, etc. can be programmed to provide various screens and marking for the E-Board, such as:
  various size WSA, say 20×30 mm to 75×125 mm
  various alphabets and functions s.a. English, Greek, etc.
  various Node arrangements, s.a. Qwerty, Dvorak, etc.
  various Node sizes within any specific WSA
  various other variations, as designers can imagine
  various logical combinations of above factors.

Such an E-Board can be 1-Pad, Multi-Pad, Integral to MCC, Detachable, External, etc.

Some Preferred Embodiment(s):
  Uses one of Preferred DIPs from section A, preferably Elastomer Dome Array.
  Each Pad has 35 Nodes of 10 mm Dia. arranged diagonally, 17 mm center to center.
  Thumb Nodes and special character Nodes are designed for optimal shape for use
  Integral E-Board has one or two Pads, attached to MCC side(s), and fold over it. One or two mainly Photo Cell SEBs (PC-SEB) attach to unused sides of MCC. PC-SEBs are also foldable over the face of the MCC for transport and protection.
  Detachable E-Board (DEB) has an attached Output Connector that can fold over it. A Circuit Curve Limiter protects circuitry at the foldable areas.
  Said Output Connector has a Detachable Output Plug for each different MCC.
  DEB is "suspended" to one of MCC sides, and can fold over the MCC as cover.
  DEB can also be strapped to the arm or placed on desk for operation.
  Two-Pad DEB, has 2 single Pads, attached to each other along their shorter sides.
  It is "curveable" around the top or bottom of MCC for transport.

Lift Function or Node:

One pad E-Boards and/or E-Pads are primarily activated by same hand.

So holding the Shift Node while operating another reduces the free fingers.

A solution is to provide another type of Function, which we call Lift Function.

It can generate a different characters function when activated before or after a node, than the primary character or function allocated to said Node.

But it need not be held or touched continuously from before to after the other Node is activated. So the finger activating it is set free to active next Node.

Providing Node Activation Feedback:
  Most Digital Input Platforms in section A provide no Tactile feed-back.
  Compensating techniques are:
  1—Auditory means, such as "beep" to confirm activation
  2—Coarse markers on or around each Node that would be sensed by skin touch
  3—An optional and detachable thin Elastomer Tactile Layer.

Elastomer Tactile Layer (ETL):

ETL is like the Elastomer part of Elastomer Dome Array to be placed over E-Board. Thus LAF yet Tactile Feel is provided in the same way Elastomer Keypads do.

LAF can also prevent unintended touch for Touch Sensitive DIPs or a distance for Proximity Sensing DIPs, allowing fingers to rest on Home Nodes.

ETL can have clamps ringed around it to hold it on the E-Board.

Elasticity allows the operator to remove it when not needed.

Top of each elastomer key can be:
  "conductive" if needed for E-Board's underlying DIP
  "open" if needed for DIP that require direct finger touch on the Node Interchangeable Node Markings:

Elastomer Tactile Layer can be changed for different Character sets, say English to Greek, and for different Node arrangements such as Qwerty to Dvorak.

A suitably programmed Driver can make the corresponding Electronic changes too.

Without tactile, an ultrathin, even below one tenth of mm, elastomer layer is sufficient.

Certain Capacitives and Touchscreens can be programmed to show different Node Markings, without the need for such layer.

Home Nodes Finger Rests:

Many Touch Typists rest their fingers on Home Nodes, which causes unintended activation if DIP is Proximity or Touch Sensitive, such as in Capacitive systems.

To prevent this, one method is using an Elastomer Tactile Layer, explained.

But ETL increases thickness, which may not be desirable.

One technique is a suitable E-Board Driver Software or E-Board Controller Firmware. The systems algorithm ignores continuous touch of finger on any Node.

Many different algorithms can be designed to suit various circumstances.

Making Detachable E-Board (DEB), "Specific" to a MCC

Various options to make DEB to suit a specific MCC, are "making":

1—Circuit Board Electronics & Output Connector, all "specific" to a MCC
2—"Universal" Circuit Board but "specific" detachable Output Connector & Electronics
3—"Universal" Circuit Board & Electronics but "specific" Output Connector (OC)
4—"Universal" Circuit Board, Electronics & OC but "specific" detachable Output Plug. "Output plug" is the tail end of the Output Connector, that enters the MCC Input Port Wireless Connection to the MCC:

The E-Board can be wirelessly connected to MCC if it has it own power supply.

Thus no need for a physical output connector.

One way of providing Power is a small battery, preferably placed on a Holding device that may be used to hold the E-Board to MCC.

Another is to attach a Thin, Replaceable or Rechargeable, preferably Removable battery. Very thin batteries exist, some using polymer films thinner than a fraction of mm.

Another way is to place a Photo Cell Layer, preferably removeable, occupying areas that do not adversely affect E-Board's function.

Detachable E-Board (DEB)—Operational Locations

DEB can be made to suit various operating situations, such as:
 On the desk
 Attached to belt, using a belt loop and long or wireless Output Connector (OC)
 Suspended from the neck, using a necklace and long or wireless OC
 Attached to clothes, using Pins, Velcro, Sewing, etc., plus long/wireless OC
 Attached to the sleeve close to the MCC
 Strapped by Velcro or Elastic Straps, to arm, wrist or hand close to MCC
 Attached to or Suspended from the MCC, using suitable "suspenders"
 Opposite the tips of fingers, held by a suitable "DEB Holder"
 Backside of the MCC
 Other positions E-Board Doubling as MCC Cover E-Board can double as an MCC cover, (F10) eliminating the need for a cover. E-Board can be made lighter and thinner than a typical MCC cover.

Thus reducing overall weight and/or volume of the combined MCC+E-Board.

An E-Pad, hinged to one side of an MCC can pivot to cover said MCC screen.

It can also pivot in the different direction to be operated.

A Suitable hinge, well know to the skilled, can keep it firmly in operational position without letting it fold too far back.

Hand Writing Pad (HWP) on E-Board

E-Board should eliminate the need for a HWP, but if needed, HWP can be placed over the E-Board to save the working surface of the MCC for a larger screen.

HWP can also be a Sub-E-Board, connected to either E-Board or MCC by flexible or foldable cables, using our relevant techniques, such as Circuit Curve Limiters, to be folded or disconnected for transport and unfolded or connected for use.

Such a segregated HWP can be made much larger than a HWP on MCC or E-Board.

It can be as large as one pocket size Pad, not limited to scarce space.

E-Board located HWP frees space for more Screen, Memory, Processor, Battery, etc. Similarly, an E-Board can harbour a Touch Pad or Mouse Pad, preferably a Thin Film Capacitive Touch Pad. This reduces or eliminates the need for the Touchscreen used as a layer on top of MCC screens, hence reducing the weight, thickness and perhaps price of an MCC.

E-Board can also have all functions such as Scroll, which typically occupy part of an MCC working surface, allowing a much larger screen.

E-Board/MCC Configurations

Integral E-Board (IEB) can be attached to MCC in numerous locations.

Detachable E-Board (DEB) has more freedom of location alongside MCC.

All IEB configurations can be achieved for DEB using suitable "suspenders" Suspenders can keep DEB alongside MCC in locations that are awkward for IEB.

DEB can also be "unsuspended" from MCC, say "strapped" to the operators arm.

DEB can also be "separated" from MCC, while operated on a desk.

Figure 10:
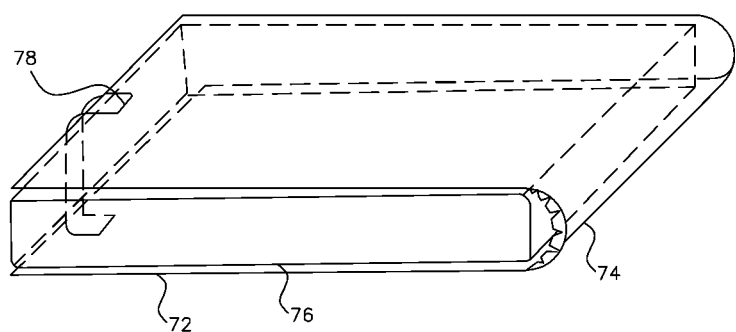
FIG. 10 shows a 2-Pad E-Board covering an MCC
Figure 11:
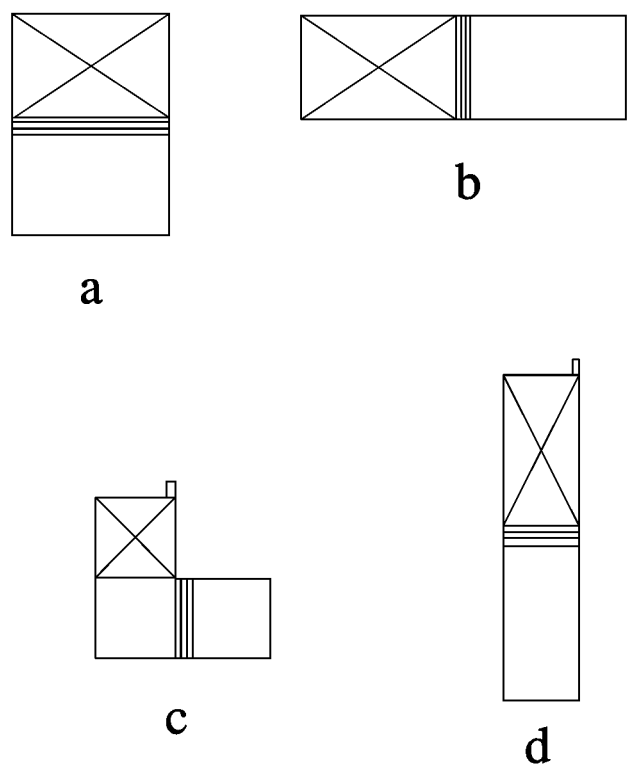
FIG. 11 shows some configurations of a 1-Pad Integral E-Board with an MCC
Figure 12:
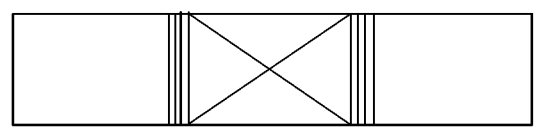
FIG. 12 shows some configurations of a 2-Pad Integral E-Board with an MCC
Figure 12:
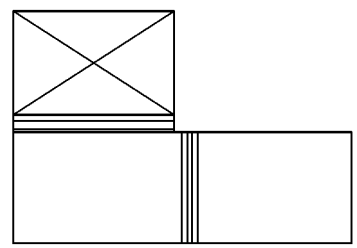
Figure 12:
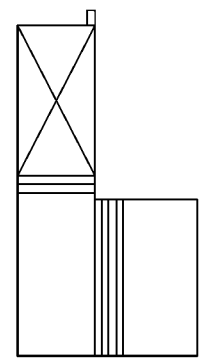
Figure 12:
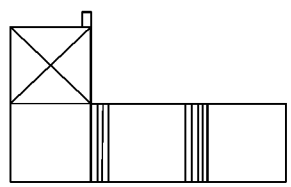
Figure 13:
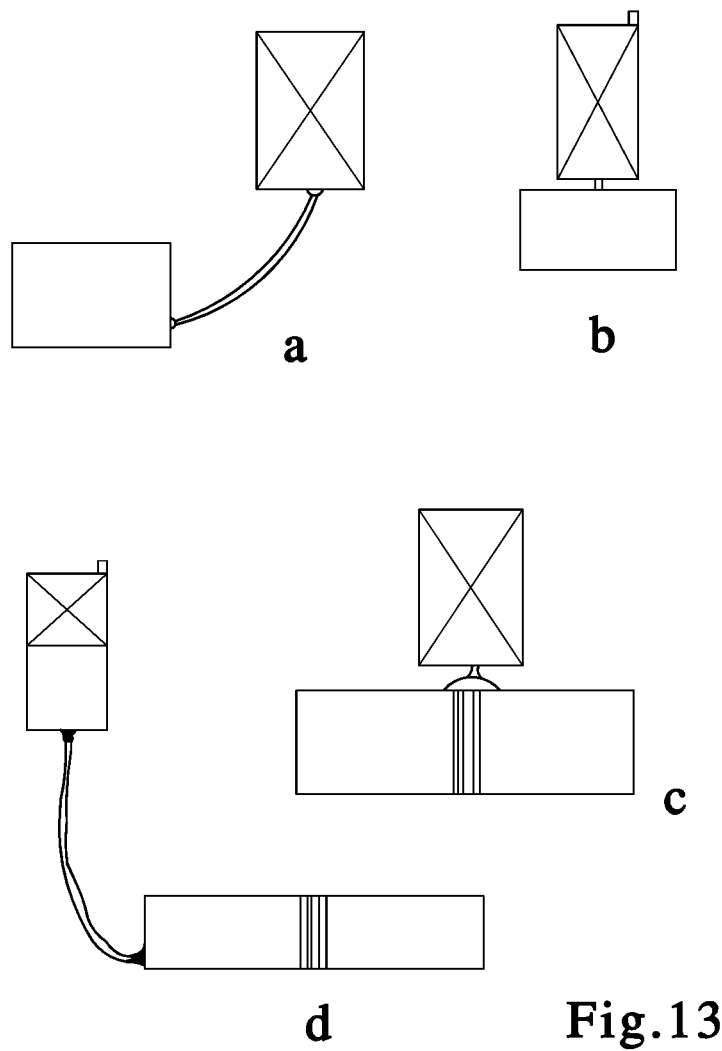
FIG. 13 shows some additional configurations of 1-Pad & 2-Pad E-Board with MCC
Figure 14:
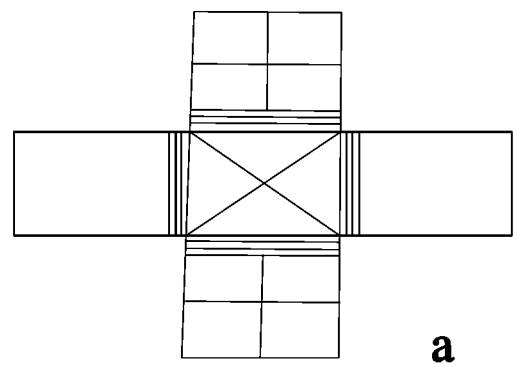
FIG. 14 shows MCCs with a multi-Pad E-Board, some Pads are Photo Electric Cells FIG. 15 a preliminary example layout design of character markings of a 2-Pad E-Board
Figure 14:
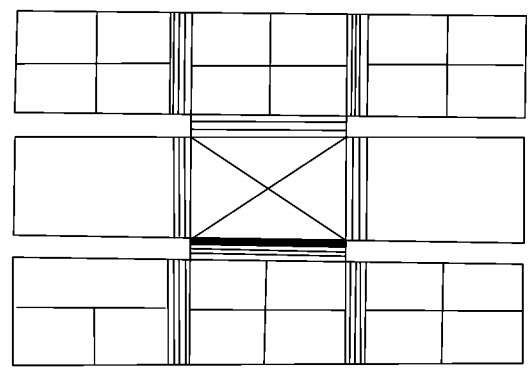
Figure 15:
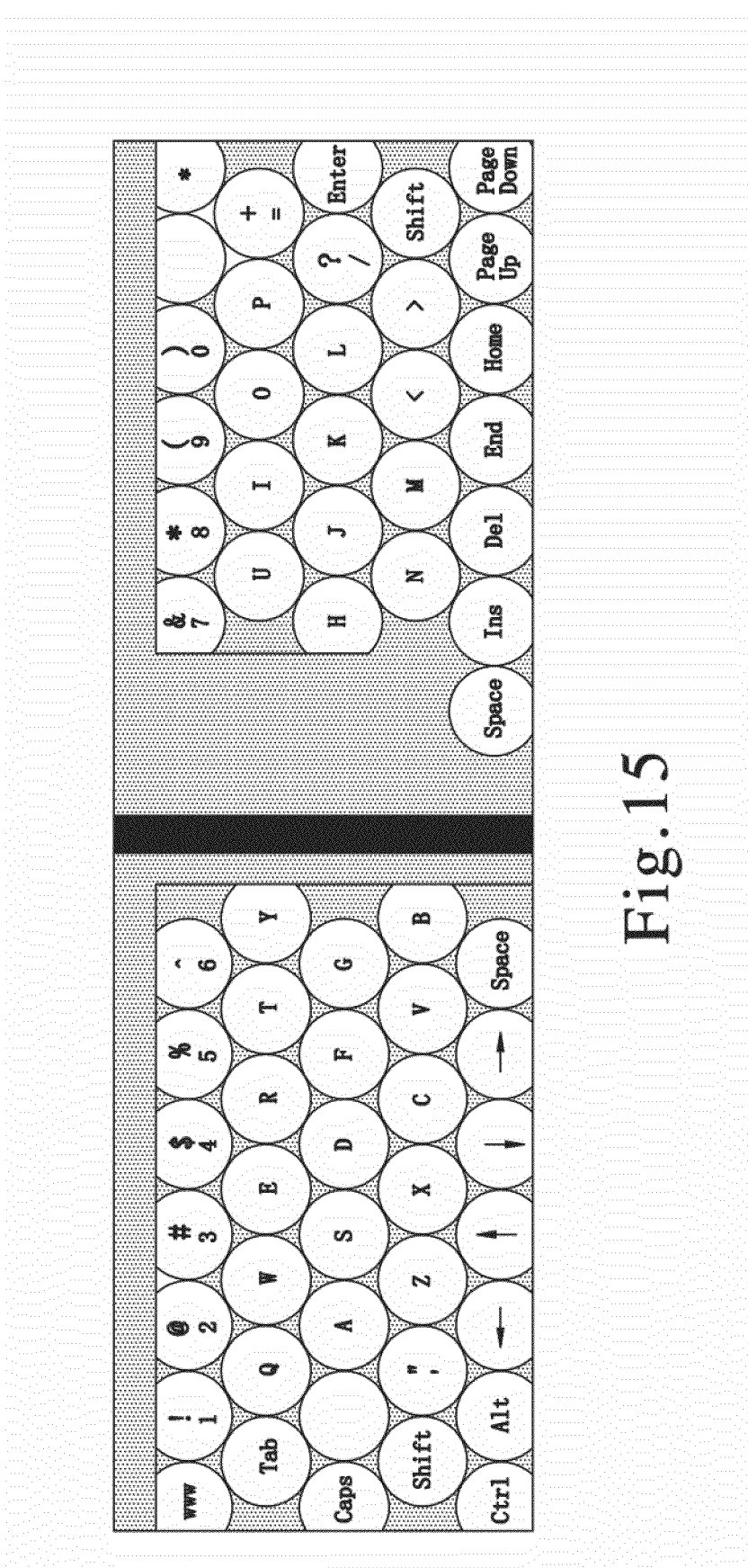

FIGS. 10,11,12,13,14 show example E-Board/MCC configurations. In each Fig.:—diagonally crossed part denotes the screen or the MCC
 blank part(s) denote E-Board Pad(s)
 vertical/horizontal crossed parts denote Photo Cell Pads
 4—parallel lines denote "acute" Fold Strips
 5—parallel lined denote "curving" Fold Strips
 an antenna illustrates that MCC can be a Cell Phone
 FIG. 10 shows a 2-Pad E-Board curving around and acting also as MCC cover
 FIG. 11 shows some 1-Pad Integral E-Board configurations
 FIG. 12 shows some typical 2-Pad Integral E-Board configurations
 FIG. 13 a—a 1-Pad Detached E-Board—Say on a desk
 FIG. 13 b—a 1-Pad Detachable E-Board suspended from MCC
 FIG. 13 c—a 2-Pad Detachable E-Board suspended from MCC
 Each Pad is connected to Output Connector independent of the other Pad
 Pads don't have to be connected to each other mechanically nor electrically
 FIG. 13 d—a 2-Pad Detached E-Board
 Say a DEB strapped to right arm, operated by left hand. Cell Phone held by right hand.
 FIG. 14 a—a 4-Pad Integral E-Board. 2 Pads are Photo Cells
 All pads fold over the MCC in turn, for transport.
 FIG. 14 b—a 2+6-Pad Integral E-Board. 2 Node Pads+6 Photo Cell Pads (PCP)

In F14, for pocket transport, the following folding sequence can be performed:
 two Node Pads fold over the front of MCC
 central upper PCP folds over the front of MCC
 right upper PCP curves around the right side of MCC and folds over MCC's back
 left upper PCP curves around the MCC's left side and folds over MCC's back
 central lower PCP folds over the front of MCC
 right lower PCP curves around MCC's right side and folds over MCC's back left lower PCP curves around MCC's left side and folds over MCC's back For operation, MCC and E-Board can rest on desk or lap.

For hand held operation, a strap at the back of the MCC can hold the MCC to the hand.

Pointer or Cursor Function:

PF (F5) is introduced in this Description as an alternative to "mouse".

A desk operated mouse is not suitable for MCC, especially on the move.

A "ball mouse" is too thick for MCC.

Mouse Pads used for notebooks occupy too much of scarce area on MCC or E-Board.

"Stylus" requires a costly "touchscreen" imposed on MCC's LCD plus a pen to carry.

PF resolves all above, as one compound Node on the E-Board or MCC.

Replacing a costly touchscreen and stylus, mouse ball or mouse pad, by just one Node, saves scarce space, cost, complexity, weight, bulk, etc.

PF is a "Compound Node" (F5-80) having 4 Sub Nodes (SN) (F5-82).

One finger should be able to roll over all SNs, with minimal lateral movement.

Activating one SN should not automatically activate other SNs.

Theoretically Three or more SNs can do the job, but four is easier or more intuitive. The E-Board or PF specific Controller (or its equivalent), measure the "intensity" of touch in all SNs, and determine position of the Cursor, by an algorithm.

Such algorithm can have variations determined by designers.

One algorithm can assume an Algebraic "Vector" for each SN, which "magnitude" or "absolute value" is determined by intensity of touch at said SN, and which "direction" resembles the approximate direction of said SN.

Thus Algebraic sum of said Vectors can determine the Location of Cursor.

As an example, one SN measures Positive Y axis, the opposite SN denotes the Negative Y axis. So the Y coordinate is determined from algebraic sum of above. Similarly for the X axis. Hence X-Y coordinates of the Cursor is determined by relative Intensity of all the Sub-Nodes on the Cursor Node.

Various measures of "Intensity" are discussed elsewhere in this Description.

One factor in measuring "Intensity" that can be used in E-Board, but is of particular value for Pointer Node is "duration of activation". If one Sub-Node is held longer, it can be give a higher "intensity value".

Rolling of the operators finger on PF changes the pointer location.

Rolling to right, left, up or down drives the pointer on the screen.

To make it more intuitive, the Sub-Nodes better represent up, down, left &right.

When pointer is on the desired point, the operator can press "enter" (say) to confirm. Alternatively, just lifting the finger may be used as confirmation.

Alternative electronic designs are possible. A good choice is a Capacitive DIPs.

SNs can be electronically disconnected by non-electroconductive region (F5-84). Placing finger over PF affects capacitance in each SN, proportional to the area of each SN covered by the finger and also pressure applied to each SN.

PF's circuit and electronics can be designed, using techniques known to the skilled, to measure capacitance in each SN, and translate their algebraic sum to the location of pointer on the screen.

One alternative can measure the electric flow, instead of capacitance, between SNs. PF can have a Conductive Center (CC) (F5-86), electronically separated from all SNs. Placing finger on PF affects electric flow and/or capacitance between the CC and any SN connected to it by finger's conductivity.

The more a section is covered by finger and the more pressure exerted on a section, the more the flow between CC and that SN.

The algebraic sums of flows to/from different SNs can be translated by the processor to the position of the pointer on the screen.

If capacitance is measured, PF can be covered by a thin non-electroconductive layer. Finger proximity can change capacitance in covered sections.

PF is cheaper and lighter than touchscreen stylus, and saves having to carry a stylus.

A 4-SN Cursor Node can also play the role of and eliminate the need for a "Scroll".

Cursor Node may use a different DIP than the rest of the E-Board.

Capacitive DIP suits a Cursor Node better, as it easier to measure relative Intensity. So E-Board can be Elastomer Dome Array, while PF is Capacitive.

Yet both can use the same E-Board physically. Each can have separate controller. Preferable E-Board and Pointer Node should share the Controller and Driver.

Scroll Function:

Conventional Scrolls have 2 keys for up/down plus often 2 keys for right/left.

Said keys are placed together as one scroll key, operated by one finger or thumb. Scroll moves a selector up, down right or left on the screen, to selected target.

Scroll Node can be added to E-Board by 1, 2, 3 or 4 closely placed Nodes.

By moving the scroll to the E-Board, MCC screen can become larger.

Removing scroll keys from MCC saves scarce allowance of weight and volume that can be allocated to more battery memory, processor, etc.

Scroll Node can also use "duration of activation of each Sub-Node" as a measure to determine how far and in what direction to move its screen indicator.

Circuit Curve Limitor (CCL):

For E-Board, especially for production considerations, it is better that Sub E-Boards have continuous circuits, between various SEBs, in particular between Pads.

Continuous Circuits are more power efficient, can work with lower voltage and amps, are easier and cheaper to produce, and are more reliable.

When any Flexible Film Circuit Board is to be folded along an axis, it is important that the curvature of folding does not fall below a minimum radius, otherwise:

the circuit inside or on the flexible film will break after repetitive folding the flexible film will crease, crack and tear, when subjected to repetitive folding To solve this problem this Description introduces Circuit Curve Limitor (CCL).

It is made of an Elastomer (Rubber-Like) material. Its general shape is as in F6.

It is adhered to the surface of flexible circuit board, such that its Imaginary Fold Axis (IFA) shown in F6a-90 substantially covers the Circuit Fold Axis (CFA).

CCL should preferably cover all of the Fold Strip, and more, but not over any Node.

CCL length or the size of its IFA can be shorter, but should preferably be same or marginally longer than the length of the Fold Strip.

CCL width can be less but should preferably be equal or more than Fold Strip width.

CCL can have no Peak nor Valley, (no grooves), just a Thickener Elastomer Band.

CCL can have one Peak (F6b-92) or more. It can have or one Valley (F6b-94) or more.

Number and dimensions of Peaks and Valleys and thickness of the base (F6b-96) are determined by width of Fold Strip (FS) and required minimum Fold Curve Radius. Dimensions in F6 are examples only. F6 example covers a 14 mm wide Fold Strip. F6c example insures a lower limit of 6 mm as the circuit fold curve diameter.

In other words, a CCL less than 2 mm thick designed as described here, can

In other words, a CCL only 2 mm thick if designed according to this Description can ensure that the circuit will not fold more acute than 6 mm diameter of curve at fold.

CCL prevents the circuit board from folding more acutely than its own fold radius.

The grooves make folding easier, and reduce internal stress.

F6 shows CCL: (a) perspective, (b) unfolded cross section, (c) folded cross section.

CCL can be used for single and multi pad E-Boards at junction of
  Output Connector and E-Board
  Output Connector and MCC
  Integral E-Board and MCC
  Adjacent Pads, over the Fold Strip
  Any two segments of a circuit board that are folding along a folding junction CCL, with or without Grooves, reduces damage to the Circuit and the Flex-board. It may be adhered to the undersurface of the Flex-board along the Fold Strip also.

Other Types of Circuit Curve Limitors:

Following CCLs are also mentioned for completeness, and potential utility:

1—A Rubberlike Cylindrical full rod (F16a-252) or hollow tube, stuck along CFA

2—A Rubberlike hollow or full tube which cross section is not a full circle, to reduce thickness (F16a-254)

3—Two opposing solid "bands" having a J shaped width cross section (F16b-256).

Each band covers one of the right or left halves of the Fold Strip (F16a-250).

Js' tails meet at a line above and parallel to CFA. (F16-b 258)

When the circuit board is folded, opposing Js form a U, limiting Fold Curve Radius.

Figure 16:
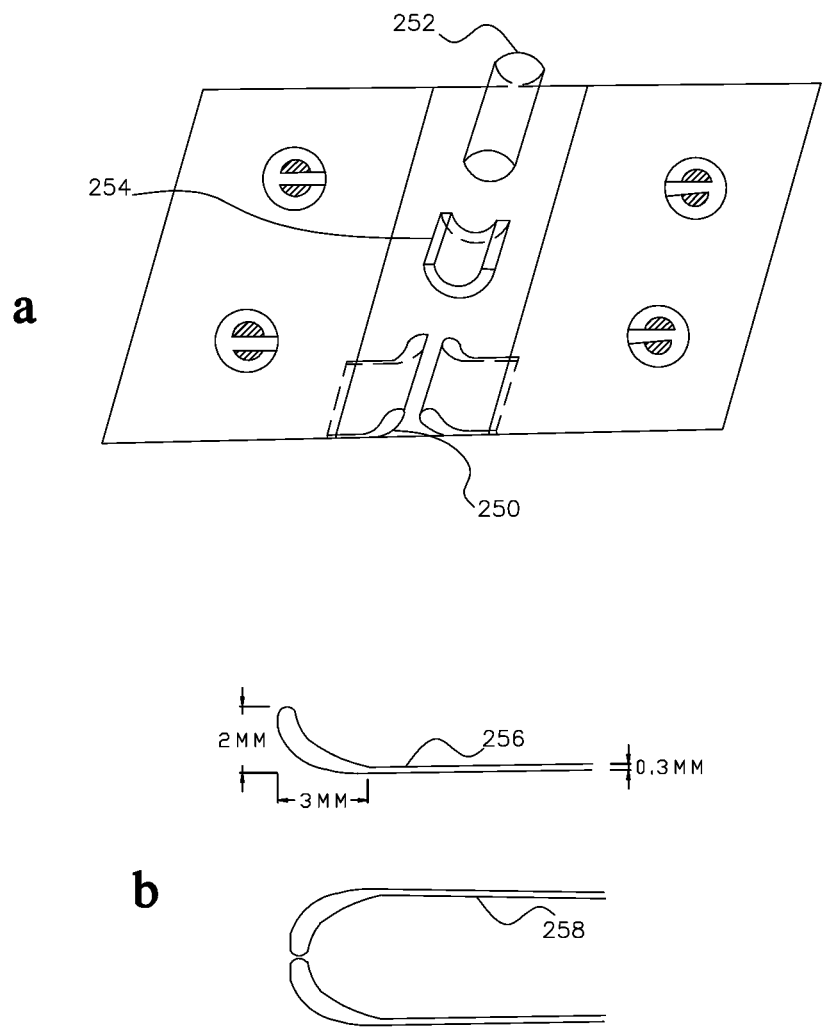
FIG. 16 shows 3 different types of CCLs, all on one 2-Pad E-Board for brevity

FIG. 16a is perspective of all above, shown on one 2-Pad E-Board to save repetition.

Reducing the Safe Curve Radius (SCR) of a Foldable Circuit Board (FCB):

A FCB has to maintain a SCR.

Folding acutely beyond SCR can damage the "circuit" or the "flex-board" at the Fold.

This Description introduces a technique for allowing more acute SCR.

The "flex-board" can usually withstand smaller SCR than the "circuit".

Flex-board's SCR can be reduced by choosing softer, thinner, more flexible material.

But the "circuit" is metallic, usually copper, with a larger, less acute SCR.

If Connecting Lines (CL) (F2-66&68) between adjoined SEBs are perpendicular to CFA (F2-68), their Curve Radius will be the same as Flex-board's CR.

But an Oblique CL at acute angle to CFA (F2-66), spreads the CR over a longer CL. Hence a less acute Curve Radius for the Connecting Lines than CR of the Flex-board. Thus Flex-board can be folded more acutely, while the circuit maintains its SCR.

The longer the CL and the smaller the angle that CL makes with the CFA, the smaller the Safe Curve Radius of the Foldable Circuit Board can be.

Another technique is to use Multiple Connecting Lines instead of a Single Connecting Line connecting the same points on the adjacent SEBs. Thus if one line is broken due to numerous flexing and abuse, the other lines carry the current. (F23-320)

This allows a more acute Safe Curve Radius than a single Connecting Line

Making Multiple Connecting Lines "oblique", furthers SCR reduction ability.

Another technique is to use a Circuit Connecting Grid (CCG) (F23-322) between each two points on adjacent SEBs that need to be electronically connected.

CCG has Multiple Connecting Lines, each line connected to adjacent line(s) at several points along its length.

Such a Grid can break in many points, but will remain connected from end to end. This allows a more acute Safe Curve Radius than Single or Multi Connecting Lines. Making CCG Oblique enhances its SRC reduction ability.

SRC reduction techniques can alternatively increase longevity of curving circuit.

For production simplicity, economy and electronic efficiency, it is a good idea to print the circuit of all the E-Board on one Flex-board.

Even if each SEB is a separate PCB, it is easier to connect them by Flex circuits.

Above SRC reduction techniques are most useful when the Fold Strip is Flex-board.

Above techniques take us from a U-Curve to an acute U-Fold.

Figure 24:
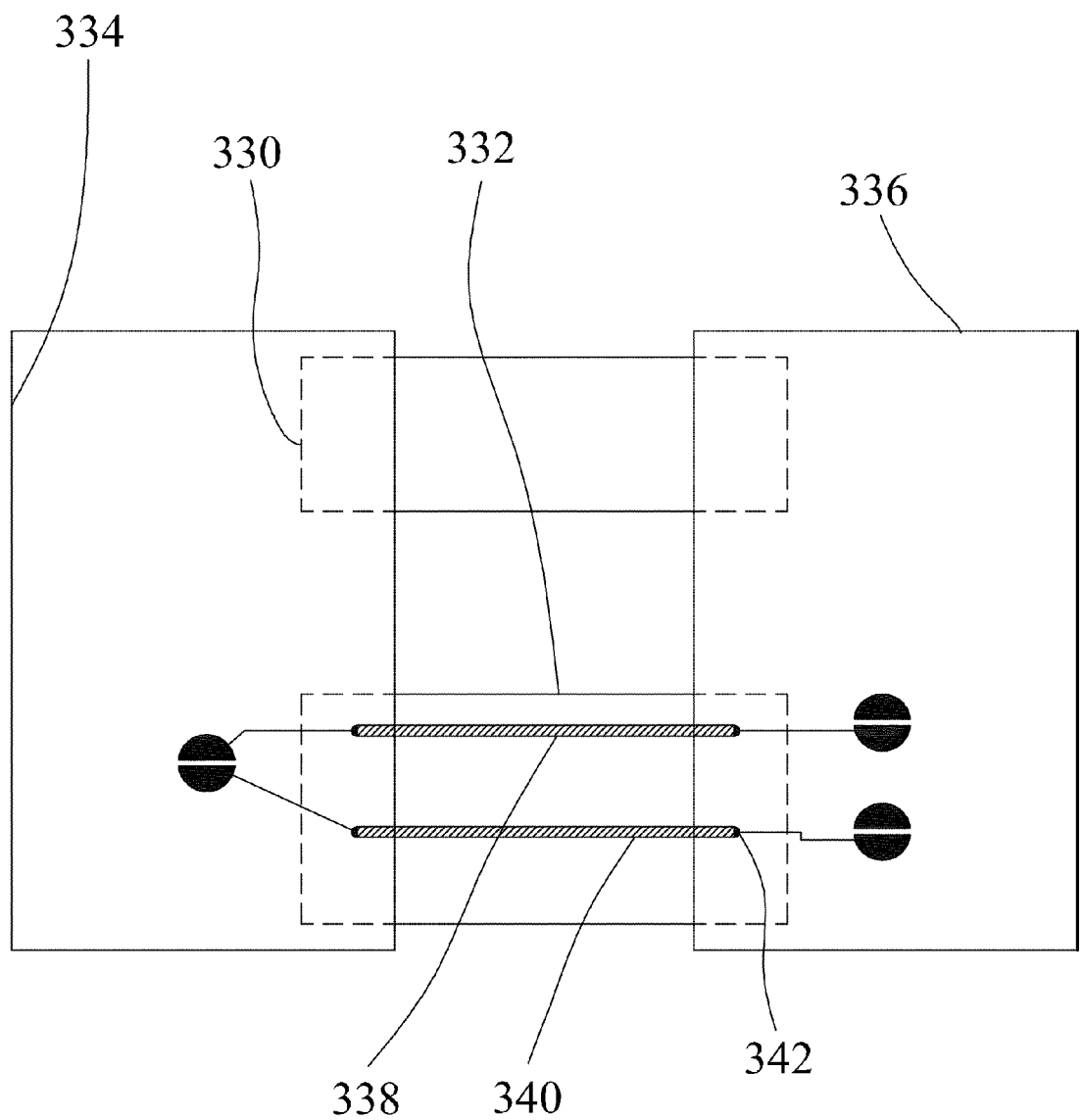
FIG. 24 shows Elastomer Fold Strip(s), and Conductive Elastomer Connectors

Elastomer Circuit Connectors (ECC):

Each SEB can be a separate Printed Circuit Board, held to adjacent SEB side physically by Non-conductive Elastomer adhered to both SEBs along their Fold Strip. FIG. 24 shows two such holding bands F24-330 & F24-332, holding adjacent SEBs F24-334 & F24-336 together, physically, but by themselves don't conduct electricity.

Such Non-Conductive Elastomer should preferably not stretch, so a layer of non stretch fiber, such as a cloth layer better be adhered to it.

Alternatively, it can be made of any Non Stretch material that does not crack under repetitive folding and unfolding, such as a cloth ribbon.

Electronic Connections between such SEBs is via Thin Conductive Elastomer Strips (F24-338 & F24-340), one end (F24-342) of each Strip is adhered, using conductive adhesive, to a point on one SEB.

The other end is similarly adhered to a point on the adjacent SEB, such that current can flow from one SEB to its neighbor SEB via Conductive Elastomer Strips (CES).

A sufficient number of CES provides necessary connections between SEB circuits. CES can be adhered to the Non-conductive Elastomer Fold Strip for more support.

Each Elastomer Circuit Connector is the combination of Non-conductive Elastomer Fold Strip and accompanying Conductive Elastomer Strips.

Conductive elastomers are made by doping normal elastomers, especially Silicones with Conductive particles. They are used for electromagnetic shielding.

They have good elongation, folding and conductive properties.

However, elongation or stretching is not necessarily needed in this application. Elongation is a begin consequence of using Elastomers for their other properties. Therefore, any material that can be conductive, and can withstand repetitive acute folding and unfolding without loosing its electrical and physical properties will do.

Another example of such materials are some "Conductive Polymers".

Since there is no risk of creasing or breaking, the Fold Strip can be very narrow, keeping adjacent SEBs very close to each other, making a more integral E-Board.

Narrower Fold Strip requires shorter CES, which increases their conductivity.

For even better conductivity, CES should be made as wide as possible, considering the number of CES that are needed on a set length of the Fold Strip.

Both CES and Elastomer Fold Strip can be thinner that a fraction of mm.

Elastomer Circuit Connectors can be folded very acutely (V-fold), with no damage.

Unfold Limitor (UL):

Folding Pads of E-Board are meant to fold only face to face towards each other. UL is introduced here for preventing Pads from unfolding beyond desired angle.

UL is a "foldable flexible un-stretchable thin band" (F8-122) like a ribbon.

One side of UL (F8-124) is stuck close to the right side of the Fold Strip.

The other side of UL (F8-126) is stuck to the left side of the Fold Strip.

UL side 124 and 126 better be stuck to the Pads, without obstructing any Node.

UL width, when stretched, is less than the width of Fold Strip.

This keeps unfolded Pads at desired (less than 180 degrees) angle to each other.

An alternative, Thread UL (F8-128), can be stuck at each end (F8-130 &132) to anywhere along the sides of Pads, without obstructing any Node, hence can be longer.

Two Thread ULs can be used, stuck to parallel sides of E-Board, perpendicular to CFA.

UL can also be used between Integral E-Board and MCC.

UL is light, cheap, simple and thin.

Backfold Stopper (BS)

BS is a Thin Rigid Band (shown in F18), all part of its length (shaded area F18-d), is adhered to the underside of one of the adjoined folding Pads, substantially perpendicular to and extending to the side of said Pad that meets the Fold Strip (FS). F18-d shows the construction viewed from the underside of the E-Board.

Rest of its length (blank F18d-164), is longer than the width of the FS (F18d-160), extends across the width of FS, neither adhered to FS nor to the other Pad F18d-168.

Since both Pads and the BS are rigid, this construction stops the FS from backfolding. Since the blank peninsula is not adhered to FS, Pads' face to face folding is allowed.

BS can be integral peninsula to a Rigid (underside) Layer at the underside of the Pad.

There can be more than one BS, attached to either or both Pads, looking like teeth.

Double BS is two opposing BSs, the total lengths of their blank parts F18d-170 and F18d-172 is longer than the width of the FS F18d-160.

F18 shows cross section of a Double BS while unfolding when Pads are:

(F18-a) folded faces to face, (F18-b) partially unfolded, (F18-c) aligned

E-Board Power Supply:

E-Board, being faster than current MCC Input Devices, saves battery by allowing the operator to spend less of MCC time for the same result.

E-Board can have at least three sources of primary or supplementary power.

1—MCC's Power Source
2—Thin Rechargeable or Replaceable Batteries, attached to it.
3—Small batteri(e) placed in/on the box, clamp or other device that holds it to MCC.
4—Thin Photo Electric Cells, placed on parts of its surface
5—Photo Electric Pad(s) connected to it or to MCC, like Sub E-Board(s).
6—Thermo Voltaic Chips, that cover body or other heat to electricity.

TVC can be held to wrist or other parts of body for heat, by elastomers or otherwise. It can transfer power to E-Board via a thin cable.

This Description introduces E-Board power supplies not used in MCCs before.

These techniques are applicable to MCCs and other devices too.

Photo Electric Cells can be placed on any "part"s of the E-Board Surface that does not adversely affect electronics or operation or access to Nodes, such as between Nodes.

If such parts are not sufficient, then we can enlarge the E-Board to add needed area.

We can add entire SEBs or Pads devoted to Photo Electric Cells.

Said Photo Voltaic Cells or Rechargeable Thin Batteries can be adhered to the E-Board. But can also be in the form of a Removable Layer.

This power generating ability, makes an E-Board
able to operate with MCCs that do not supply output power
able to use a "wireless" system for electronic connection to MCC
use none or less of MCC power
add to the scarce power supply Hence reducing the bulk, weight or charging frequency of MCC battery.

It may even be able to eliminate the MCC battery.

A Multi-Pad, Photo Electric, Portable Power Generator

A Photo Electric Cell (PEC) Power Source made of one or more pads can be made. Such Pads can fold over each other or be detachable from each other or curve around MCC for ease of transport or pocket portability using the techniques described here.

This Description has shown how to make a single or multi-Pad E-Board that:
can be Detachable from or Integral to MCC
has one or more Pads
Pads can fold over each other or fold/curve over MCC without damaging the circuit
Pads can be detachable from each other or from MCC for stacking
is light and thin, when folded or stacked, for pocket transport can have a large working surface area when unfolded or assembled can be prevented from backfolding, so as to face the light even while walking An assembly of one or more PEC Pad(s) is a Portable Power Generator (PPG).

One 8×14 cm pad will give enough power for a low consumption MCC.

A (3×3) 9-Pad PPS can have an area of 9×8×14=1008 square centimeters.

This translate into power more than 336 times a calculator's PEC.

PECs can be made a fraction of mm thick, so that a multi fold can be few mm thick.

PEC Pads can be made very light.

Pads can have PECs on both top and undersurface, to catch light at any angle.

Such a Power Source, is useful not just for MCC but for any other device.

Figure 17:
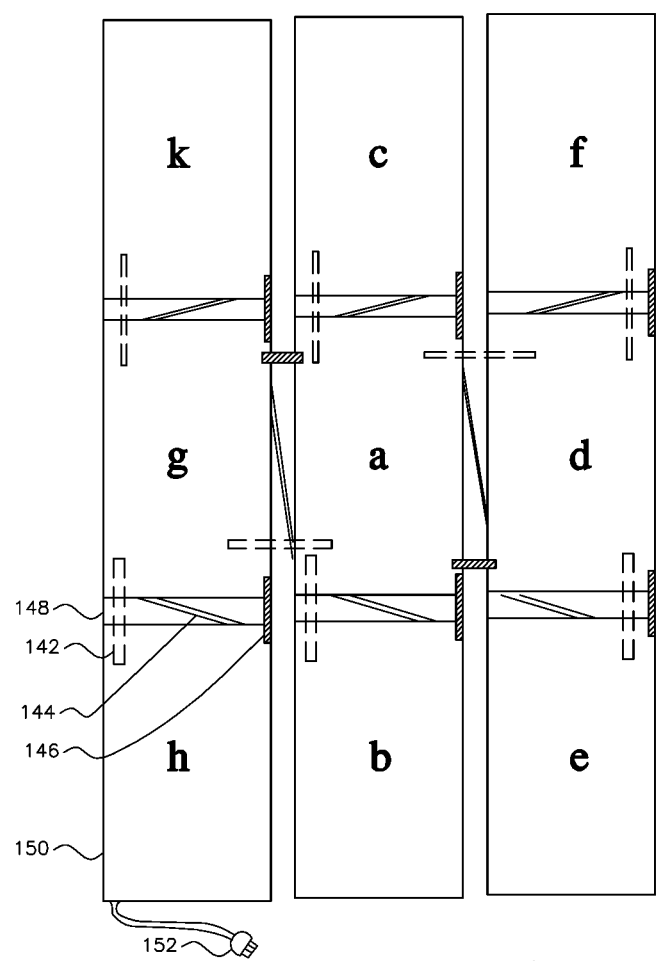
FIG. 17 shows a 9-Pad Photo Electric Cell power source
Figure 18:
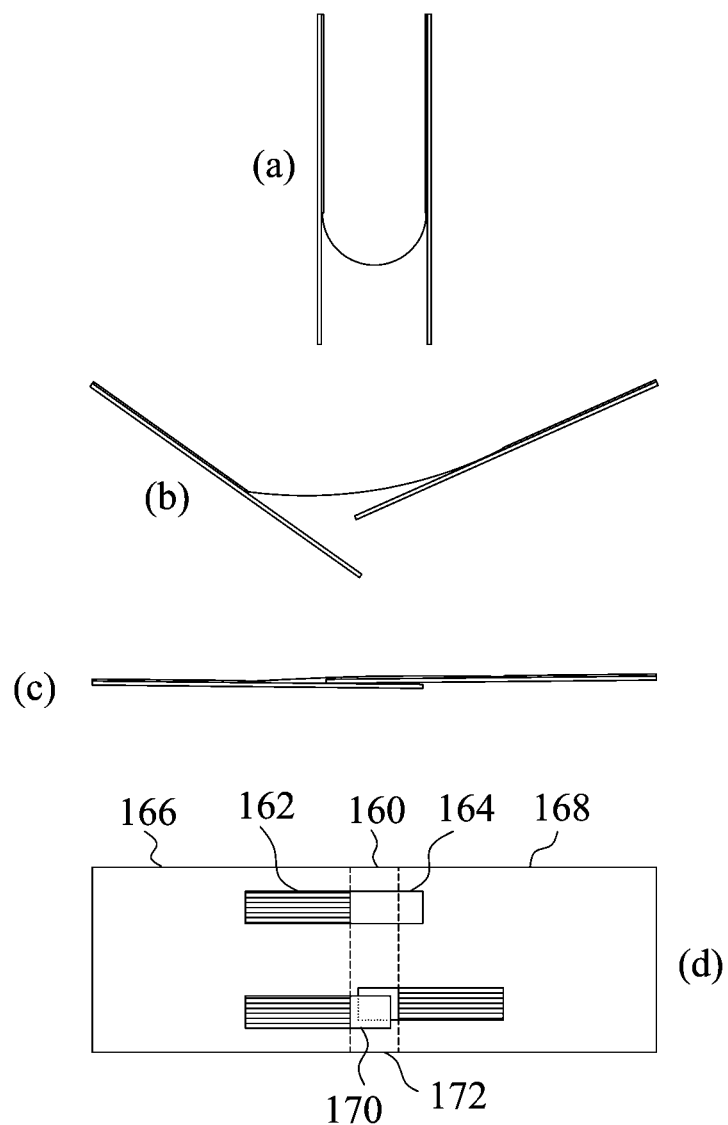
FIG. 18 shows two types of Backfold Stoppers
Figure 19:
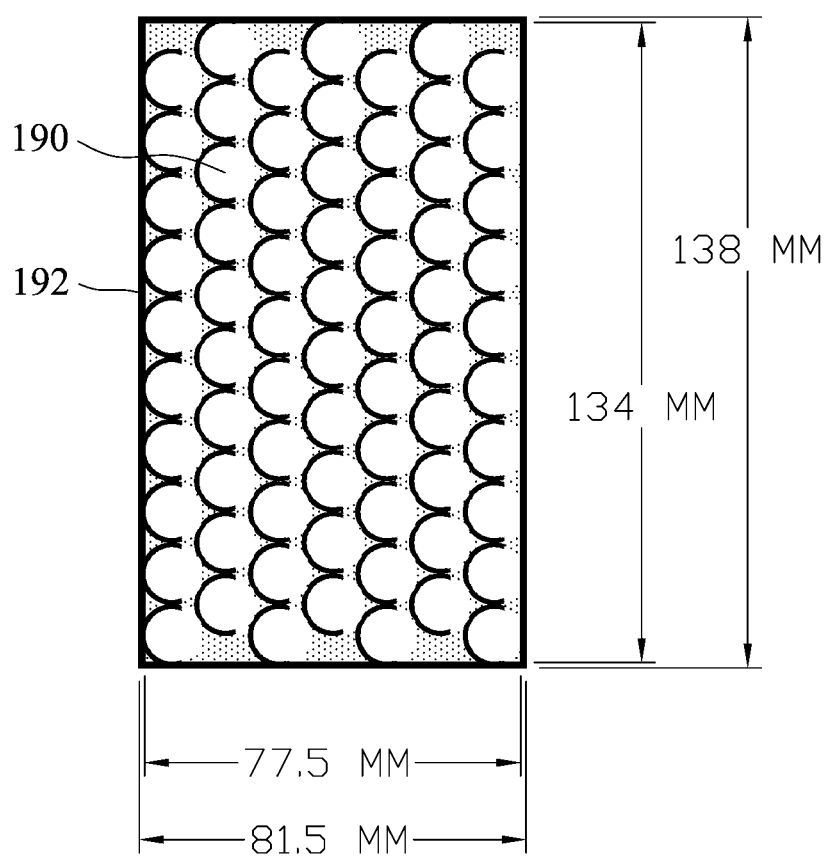
FIG. 19 shows a 1-Pad E-Board of Bowl Nodes, viewed from above working surface
Figure 20:
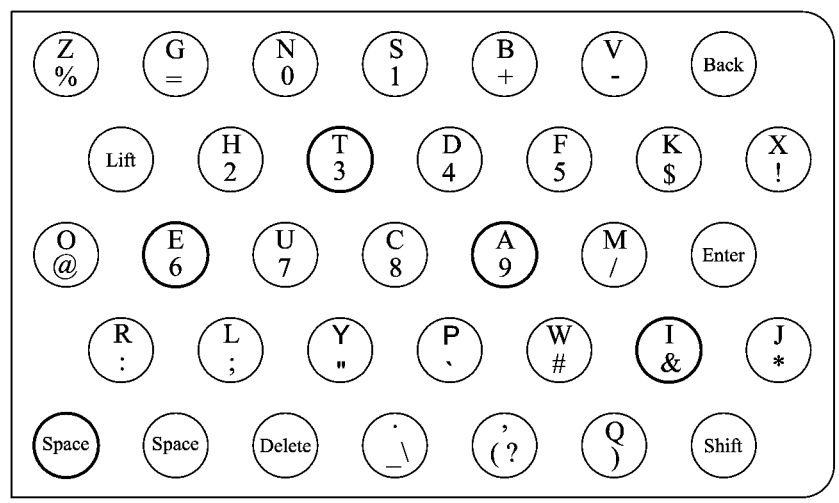
FIG. 20 shows shows a 1-Pad E-Board with round Nodes and a proposed Layout

FIG. 17 shows one version of a 9-Pad PEC, on which

Each Pad 150 is a rigid, but light and thin PEC film

Most adjacent pads are connected via a Fold Strip 148, of flexible curveable material Fold Strips harbor Conductive Lines 144 between circuits of Pads Backfold Preventers 146 can be provided between adjacent and connected Pads Generated current is directed via the Output Plug 152 to the consuming device One folding sequence of Pads a, b, c, d, e, f, g, h, k is (FO means folds over)

*b-face FO a-face
*c-face FO b-back
*d-face FO c-back
*f-face FO a-back
*e-face FO f-back
*g-face FO d-back
*k-face FO e-back
*h-face FO k-back For transport, the multi-fold is kept folded by Velcro, a rubber loop, etc.

Elastomer Circuit Boards (ECB):

To reduce thickness of the working surface of the E-Board, one technique is to choose thin material for the circuit board.

To make the E-Board flexible, one technique is to use flexible material.

For multi dimensional flexibility, this Description teaches Elastomer Circuit Boards.

Prior art for obtaining flexibility and thinness uses Flex Circuit Board, made of one or more layers of very thin film, such as Kaptan. Flex-boards have following limitations:

They don't fold. They "crease" if folded and pressed at the fold, breaking the circuitry They only curve or flex or roll along one axis at a time.

It is not possible to curve them along both x and y axis simultaneously.

If folded beyond a Safe Curve Radius the circuitry is damaged

They break or tear relatively easily.

Their material is expensive, to withstand conditions of circuit production and use.

They are not resilient enough for external use, and must be covered or protected Said limitations don't matter, when encased inside (say) a foldable flip cell phone, which only folds along one axis around a safe Curve Radius.

But they are not suitable for use as a thin E-Board, adhered to user's sleeves, or subject to creasing, abrasion, multi direction or multi dimensional folding.

One suitable group of material to use as the "board" for "circuit board" is Elastomers.

Rubber likes s.a. Latex, Silicone, Urethane or any material with following properties:

Non-electro conductive, or usable as a base for electronic circuit to be printed on Can be made conductive at desired locations by doping or lining with conductives Can be made very thin—such as latex in condoms Can be made thicker in desired areas. Not so easy to do with flex films.

Cheap and abundant, compared with flex films

Resilient against physical adversaries, such as tear, erosion, abrasion, shock, pressure, hammering, heat, cold, humidity, dryness, etc.

Resilient against most chemicals

Truck tires withstand physical & chemical abuse, carrying 40 tons for 100,000 km Can be folded at any tight angle without creasing Can curve, bend or fold in multiple directions simultaneously. A rubber sheet can be folded at point "o" to create 3 planes xoy, xoz, yoz, even at acute angles.

Can contour to any 2 or 3 Dimensional shape. Flex Films can only be 2-D.

Can be made very soft or very hard, in desired locations. Not easy with films

We can use soft rubber for the folding areas of E-Board, hard rubber elsewhere

Can withstand the heat and other conditions of adhering circuits upon them.

Have all the advantages of flex films, but none of the Disadvantages

In addition to all, Elastomers can "stretch", in any direction and "restretch". Stretchability, a feature not owned by flex films, is not the same as flexibility.

Stretchability must be harnessed, otherwise the unstretchable circuit may break. A rubber circuit board, would not stretch unintentionally, especially if enclosed. But if its location or use subjects it to stretching, the circuit may be damaged.

To prevent stretching, while maintaining all other properties, we can add one or more layers of nets or fiber mesh made of thin flexible but not stretchable fibers. Examples of such fibers are cotton (natural) and Kevlar (synthetic).

Techniques for printing circuits to a Flex-board can be modified to Elastomers.

Conductive doping techniques can be applied to print circuits onto Elastomers.

Another technique introduced here is as follows:

Print the mapping of intended circuit, using a conductive flexible glue over the Elastomer's surface, by silkscreen or other available technology, to Then spray the surface with a powder made of conductive particles.

Or the surface can be spread, face down over a tray filled with such particles.

Therefore, particles will stick to the surface along glue lines.

Let the conductive glue cure, to fix the conductive particles on the Elastomer.

Clear excess of conductive powder by washing, wiping or blowing.

Round conductive particles can do the job, but not the best option, because particles can be separated from each other due to contour stretching of the Elastomer base.

Conductive particles better be tiny, thin, long, preferably flat and flexible strands. Metals s.a. Gold particles and microscopic long conductive carbon tubes are suitable. Thus each strand is connected and intertwined with several other strands. Bending and folding the surface cannot easily break multi particle connections. Strand particles are a better for many other conductive dopings too.

Contouring E-Board:

E-Board can use an Elastomer Keypad DIP, Capacitive or even some other DIP. But use Elastomer Circuit Board instead of a Printed Circuit Board or Flex-board. Thus it will behave like a thin sheet of rubber.

It can be sewn or velcroed to clothes, even if it has a large surface area.

Its Elastomer can be stiffer under or above Nodes to prevent unintended contact.

Yet softer in between Nodes to allow for easy contouring along the supporting clothes. It can therefore house more larger and better spaced Nodes than a typical E-Board. Field workers s.a. miners can utilize this feature.

CONCLUSIONS AND RAMIFICATIONS & SCOPE

In the interest of not being repetitive and to not to increase the unavoidable length of the Description, this section is reduced to mere compliance with protocol.

The E-Board and/or its various embodiments can achieve all the set objectives.

Several types of truly pocket portable (thin, light, small), truly functional fast, easy, multi finger Digital Input Board with sufficient character set were described.

Various embodiments were specified, but the invention is not confined to those. Numerous other embodiments can be derived from the Description by the skilled. Principals are laid down to enable a person skilled in the art to create further embodiments when future needed materials or other elements are introduced.

The scope of the invention is not confined to what is written, but whatever can be created by a person skilled in the art, using all that can be extracted from the Description, and all the skill expected of a person skilled in the art.

A note on claims: To eliminate any ambiguity, in multiple dependent claims in this application, a "comma", separating two claim Number, denote "or".

The invention claimed is:

1. A keyboard for an electronic device, having a working surface harboring a number of keys and markings to denote the function(s) and character(s) each key represents, each key with a sensitive part on its surface called a node, placing a finger on which node will activate said key, where: at least part of said working surface rests onto a monitor of said device at least while typing; said part over the monitor is transparent; said markings are translucent at least across said on monitor areas; said markings are formed by a physical layer over and distinct from said monitor; said markings are visible both when said monitor is turned on and off; said keyboard is a component distinct from said monitor; and said markings are formed independently of the monitor's operation.

2. The keyboard of claim 1 with a touch-screen layer to which said markings are attached.

3. The keyboard of claim 1 which is a transparent layer over a monitor the device, programmed as a keyboard.

4. The keyboard of claim 1 which is a transparent layer on a monitor of the device, programmed as a keyboard, with means to manipulate the shape, size, number, positions, boundaries, functions, deleting and installing of said keys, hence forming various key layouts, including layouts with keyless zones.

5. The keyboard of claim 1 having a removable layer across at least part of its working surface, which layer harbors at least some of said markings, which layer is replaceable by a differently marked layer.

6. The keyboard of claim 1 which is physically and electronically detachable from and attachable to said device.

7. The keyboard of claim 1 where for at least a number of nodes: at least one wall on said keyboard, separates node from a number of adjacent nodes; each wall is tall enough to limit a finger from concurrently activating two keys whose nodes are separated by said wall; each wall is rigid enough to maintain said necessary height under typical typing pressure; each wall covers at least part of the perimeter of at least one node; and each wall is chosen from the types which includes segmented and continuous.

8. The keyboard of claim 7 where said walls are formed by a layer over the monitor.

9. The keyboard of claim 7 where said walls are formed by a layer over the monitor, which layer is detachable.

10. The keyboard of claim 7 the inner zone of the working surface is defined by the line connecting centers of those adjacent nodes which are adjacent to the working surface perimeter, where within said inner zone, said walls are based substantially on the perimeter of one of a (a) circle and (b) hexagon, which circles and hexagons are arranges such that the area of said inner zone is mathematically substantially minimized.

11. The keyboard of claim 1 where its transparent working surface is augmented by one or more keypads, each keypad having a working surface which is off the device monitor, at least while operating the device, each keypad is coupled with said working surface in one of (a) directly along a joint linear side and (b) via said device.

12. The keyboard of claim 11 where one segment of the working surface functions as an independent keyboard, and a user may switch from operating one segment alone to using the whole keyboard and vice versa, where a pad and the transparent working surface are each regarded as a segment.

13. A keyboard for an electronic device, having a working surface harboring a number of keys and markings to denote the function(s) and character(s) each key represents, each key with a sensitive part on its surface called a node, placing a finger on which node will activate said key, at least part of said working surface rests onto a monitor of said device at least while typing, said working surface is transparent at least across said on monitor areas, where for at least a number of: at least one wall on said board, separates such node from a number of adjacent nodes; each wall is tall enough to limit a finger from concurrently activating two keys whose nodes are separated by said wall; each wall is rigid enough to maintain said necessary height under typical typing pressure; each wall has physical volume, distinct from a virtual image of volume; each wall is sensible by user's finger, even when not viewing the keyboard; each wall covers at least part of the perimeter of at least one node; and each wall is chosen from the types which includes segmented and continuous.

14. The keyboard of claim 13 where said walls are formed by a layer over the monitor.

15. The keyboard of claim 13 where said walls are formed by a layer over the monitor, which layer is removable.

16. A keyboard for an electronic device, having a working surface harboring a number of keys and markings to denote the function(s) and character(s) each key represents, each key with a sensitive part on its surface called a node, placing a finger on which node will activate said key, at least part of said working surface rests onto a monitor of said device at least while typing, said working surface is transparent at least across said on monitor areas, where said working surface is augmented by one or more key pads, each pad having a working surfaces which is off the monitor at least when operating the device, each pad is coupled with said keyboard's working surface in one of (a) directly along a joint linear side and (b) indirectly via said device ways.

17. The keyboard of claim 16, where one segment of the working surface functions as an independent keyboard, and a user may switch from operating said segment alone to using the whole keyboard and vice versa, where a pad and the transparent working surface are each regarded as a segment.

18. A keyboard for an electronic device, having a working surface harboring a number of keys and markings to denote the function(s) and character(s) each key represents, each key with a sensitive part on its surface called a node, placing a finger on which node will activate said key, at least part of said working surface rests onto a monitor of said device at least while typing, said working surface is transparent at least across said on monitor areas, the inner zone of the working surface defined by the line connecting centers of those adjacent nodes which are adjacent to the working surface perimeter, where parts of perimeter of almost every node which falls within said inner zone:
- is substantially one of (a) circular and (b) hexagonal shapes;
- narrowest gap between perimeters of adjacent nodes is minimal;
- span between centers of adjacent nodes is minimal; and
- nodes are arranged substantially compactly arranged.

19. The keyboard of claim 18 with one or more keys, typing which, even if released before typing another key, registers a different character or function than the other key would otherwise register.

20. The keyboard of claim 18 having a number of features chosen from a list having at least the following: means for easier visual locating of nodes; means for providing node activation feedback electronically; means for providing physical tactile feedback; means for providing finger rests, physically; means for providing finger rests, electronically; means for providing changeable character sets; means for reducing overall finger movement; means for supplying power within means for attaching to device; means for optimal allocation of thumb operated key, including the thumb key being at one end of the lowest row of keys.

* * * * *